(12) United States Patent
Tanaka

(10) Patent No.: US 10,079,952 B2
(45) Date of Patent: Sep. 18, 2018

(54) SYSTEM, APPARATUS AND METHOD FOR PROCESSING AND COMBINING NOTES OR COMMENTS OF DOCUMENT REVIEWERS

(71) Applicant: Shun Tanaka, Waterloo (CA)

(72) Inventor: Shun Tanaka, Waterloo (CA)

(73) Assignee: RICOH COMPANY, LTD., Tokyo (JP)

( * ) Notice: Subject to any disclaimer, the term of this patent is extended or adjusted under 35 U.S.C. 154(b) by 41 days.

(21) Appl. No.: 14/955,786

(22) Filed: Dec. 1, 2015

(65) Prior Publication Data

US 2017/0155790 A1 Jun. 1, 2017

(51) Int. Cl.
| | |
|---|---|
| *H04N 1/21* | (2006.01) |
| *G06F 17/30* | (2006.01) |
| *G06F 3/0484* | (2013.01) |
| *G06F 17/24* | (2006.01) |
| *H04N 1/04* | (2006.01) |
| *G06K 9/00* | (2006.01) |

(52) U.S. Cl.
CPC ....... *H04N 1/2166* (2013.01); *G06F 3/04842* (2013.01); *G06F 17/241* (2013.01); *G06F 17/30011* (2013.01); *G06K 9/00442* (2013.01); *H04N 1/04* (2013.01); *G06K 2209/01* (2013.01); *H04N 2201/0094* (2013.01)

(58) Field of Classification Search
CPC ......... G06K 9/00442; G06K 9/00463; G06K 9/00456; G06K 9/46; G06K 9/34; G06K 9/344; G06K 9/342; G06K 9/00469; G06K 2209/01; G06K 2209/2045; G06F 17/30005; G06F 17/30011; G06F 17/241; G06F 17/24; G06F 17/30265; G06F 17/30268; G06F 17/3028; G06F 3/1415; H04N 1/32101; H04N 1/32128; H04N 1/32208; H04N 2201/3243; H04N 2201/3245

See application file for complete search history.

(56) References Cited

U.S. PATENT DOCUMENTS

| | | | |
|---|---|---|---|
| 5,570,435 A | 10/1996 | Bloomberg et al. | |
| 6,088,709 A * | 7/2000 | Watanabe | G06F 17/241 715/233 |
| 7,028,267 B1 * | 4/2006 | Beezer | G06F 17/241 715/802 |
| 7,346,841 B2 | 3/2008 | Kuruoglu et al. | |
| 7,526,129 B2 * | 4/2009 | Bargeron | G06K 9/00442 382/101 |
| 7,703,001 B2 | 4/2010 | Takaai et al. | |
| 8,352,477 B2 | 1/2013 | Uchida et al. | |

(Continued)

OTHER PUBLICATIONS

Mazzei et al., Extraction and Classification of Handwritten Annotations. UbiComp 2010, Sep. 26-Sep. 29, 2010, Copenhagen, Denmark.

(Continued)

*Primary Examiner* — Andrew H Lam
(74) *Attorney, Agent, or Firm* — Cooper & Dunham LLP

(57) ABSTRACT

Systems, apparatuses, methodologies and other tools can be provided for processing and managing documents, including provisions to manage and organize multiple copies or versions of a document and/or notes or comments handwritten or electronically superposed on the document or entered in a document file.

17 Claims, 31 Drawing Sheets

(56) References Cited

U.S. PATENT DOCUMENTS

| | | | |
|---|---|---|---|
| 8,458,122 | B2 | 6/2013 | Uchida et al. |
| 8,514,417 | B2 | 8/2013 | Tanaka |
| 8,767,223 | B2 | 7/2014 | Tanaka |
| 8,768,949 | B2 | 7/2014 | Uchida et al. |
| 8,885,212 | B2 | 11/2014 | Tanaka et al. |
| 8,938,650 | B2 | 1/2015 | Tanaka |
| 8,955,048 | B2 | 2/2015 | Uchida et al. |
| 9,007,631 | B2 | 4/2015 | Hagiwara et al. |
| 9,047,282 | B2 | 6/2015 | Uchida et al. |
| 2007/0271503 | A1* | 11/2007 | Harmon ............... G06F 17/241 715/230 |
| 2010/0278453 | A1* | 11/2010 | King ................... G06Q 10/10 382/321 |
| 2011/0173270 | A1 | 7/2011 | Uchida et al. |
| 2011/0225627 | A1 | 9/2011 | Uchida et al. |
| 2012/0140255 | A1 | 7/2012 | Tanaka |
| 2012/0221954 | A1 | 8/2012 | Tanaka |
| 2012/0265865 | A1 | 10/2012 | Tanaka et al. |
| 2012/0266073 | A1 | 10/2012 | Tanaka et al. |
| 2013/0208302 | A1 | 8/2013 | Tanaka et al. |
| 2013/0208303 | A1 | 8/2013 | Uchida et al. |
| 2014/0059010 | A1 | 2/2014 | Uchida et al. |
| 2014/0222989 | A1 | 8/2014 | Tanaka et al. |
| 2014/0223512 | A1 | 8/2014 | Hagiwara et al. |
| 2014/0245123 | A1* | 8/2014 | Pircher ............... G06F 17/241 715/232 |

OTHER PUBLICATIONS

Song et al., A Handwritten Character Extraction Algorithm for Multi-Language Document Image. Xi'an Jaitong University. IEEE. 2011. 1520-5363/11.

* cited by examiner

Document Editor X                         User: Samuel Lee

<u>20<sup>th</sup> Century European History</u>

Professor Samuel Lee
Section 2A
Weekly Topic: World War I

<u>World War I (Outline)</u>
Duration: July 18, 1914 – November 11, 1918
Outcome: Entente Victory (Treaty of Versailles)
Belligerents
    <u>Entente Powers (main)</u>    v.    <u>Central Powers (main)</u>
- France
- Great Britain
- Russia
- Italy
- United States

- Germany
- Austria-Hungary
- Ottoman Empire
- Bulgaria

Causes
    a. Assassination of Archduke Franz Ferdinand
    b. Political alliances between European nations
    c. Arms Race

Theatres of War
    1) Western Front
    2) Eastern Front
    3) Middle East
    4) Asia-Pacific
    5) Africa Page 1 of 4

Fig. 7A

Comments Content

| Name | User Name | Source Document | Electronic Review Document | Comments | Position |
|---|---|---|---|---|---|
| Samuel Lee | SLee1 | World War I.pdf | N/A | N/A | N/A |
| George Corinth | GCorinth5 | World War I.pdf | World War I (GCorinth5).pdf | Comment X<br>Comment I | $X_1, Y_4$<br>$X_3, Y_2$ |
| James Mahan | JMahan2 | World War I.pdf | World War I (JMahan2).pdf | Comment G<br>Comment T<br>Comment O | $X_3, Y_1$<br>$X_1, Y_2$<br>$X_7, Y_4$ |
| Steve Powell | SPowell1 | World War I.pdf | World War I (SPowell1).pdf | Comment X<br>Comment I<br>Comment G<br>Comment T<br>Comment O | $X_1, Y_4$<br>$X_3, Y_2$<br>$X_3, Y_1$<br>$X_1, Y_2$<br>$X_7, Y_4$ |

Fig. 16

SYSTEM, APPARATUS AND METHOD FOR PROCESSING AND COMBINING NOTES OR COMMENTS OF DOCUMENT REVIEWERS

This disclosure relates to systems, apparatuses, methodologies and other tools for processing and managing documents, and more specifically, such tools including provisions to manage and organize multiple copies or versions of a document and/or notes or comments handwritten or electronically superposed on the document or entered in a document file.

BACKGROUND

In the current information age, information technology (IT) tools play a significant role in our daily activities, and there are often discussions of the desirableness of a paperless society. Although IT tools are used extensively to create, edit and process electronic documents, paper is still used in many instances within various stages of document generation, editing and handling. For example, there are still many instances in which the original document is a paper document (or is in another non-electronic form), and in such case, it is common to scan such paper or non-electronic document, into a document image in electronic form, to facilitate distribution, archiving, etc. On the other hand, there are other instances in which the original document is in an electronic format (e.g., application-specific format that is no longer employed, such as .dox file created by using Multimate program, .wsd file created by WordStar program, etc.), but is not, or is no longer, in a common electronic format at the current time, and in such instance, it may be desirable or even necessary to convert the document into a document image or a file in a commonly-used electronic format.

In any event, in such examples, as well as in other instances in which the original document is already in a commonly-used electronic format, when the document (or copy thereof) is distributed or shared, it is often the case that the recipient would place notes or comments on the document or copy, to record the recipient's thoughts on paper or in electronic form. However, without an appropriate tool, such document or copy bearing notes or comments can be readily lost, or at least left in an unorganized fashion or place such that it becomes likely to be effectively lost over time.

Further, even if such author of the notes or comments has conventional IT tools (e.g., e-mail, etc.) readily available to capture, archive and distribute such notes or comments, much manual and mental efforts are needed from the sender and/or others to organize and maintain such notes and comments along with the notes and comments of others in a centralized and organized fashion, to facilitate processing of such information downstream in the information flow.

Some document review and edit applications are now available, but it typically requires the document author and each document reviewer to operate as a workgroup and use such application software. On the other hand, such approach fails to appreciate that in many instances the document author is an outsider and/or one or more document reviewers prefer, and even limit themselves, to performing the review and editing on paper.

There remains a need for tools to organize captured notes and comments, in a largely automated fashion, while facilitating information processing of the notes and comments (such as when multiple sets of notes or comments are shared).

SUMMARY

Various tools (for example, a system, an apparatus, application software, a method, etc.) can be provided for processing and managing documents, including provisions to manage and organize multiple copies or versions of a document and/or notes or comments handwritten or electronically superposed on the document or entered in a document file.

In an aspect of this disclosure, a document management apparatus may be configured, such as via one or more program modules, to compare (a) a source document registered in a document repository and (b) a scan document image of the source document, to extract, from the document image, comments added (e.g., by a document reviewer) on the source document and determine a position of the comments extracted from the document image, and upon such comment extraction, the extracted comments and corresponding position may be registered as comments content in association with the source document in the document repository. Thereafter, the comments content may be superposed on an image of the source document, in a document review user interface provided upon request. In various different circumstances, the document review user interface may show the source document, one or more selected sets of comments content, or a combination thereof.

The comments may be captured and processed in any of various ways. For example, the scan document image may be registered as a review document in association with the source document in the document repository, and in such instance, when the scan document image is registered, the comments and the position of the comments added on the document may automatically be extracted from the review document and passed as comments content for registration in association with the source document. In another example, when the document image bearing the comments added to the source document is registered along with the source document in a shared folder in the document repository, comments and corresponding position may be extracted and the comments content including the extracted comments and corresponding position may be registered in a shared folder in the document repository. Further, the comments may be extracted as text, and the extracted comments text and user name may be registered in association with the review document and the source document. In addition, the comments text may be captured as metadata of the review document, and extracted from the review document and associated with the source document.

In another aspect, multiple sets of reviewer's comments may be extracted from respective scan images and registered (along with corresponding position information) in connection with the source document, and upon request, the multiple sets of extracted comments are superposed on the image of the source document, in the document review user interface.

In another aspect, the document management apparatus may be configured to detect handwritten notes amongst the extracted comments and convert the detected handwritten notes into handwriting-converted text, and the review document is registered along with the handwriting-converted text in association with the source document in the document repository. Likewise, the document management apparatus may be configured to detect typed notes amongst the extracted comments and convert the detected typed notes into type-converted text, and in such instance, the review document is registered along with the type-converted text in association with the source document in the document repository.

In another aspect, each document in the document repository is registered in association with a unique document identifier. When a scan document image of a source document registered in the document repository is being processed, a document identifier is extracted from the scan document image, and thus the source document can be determined based on the extracted document identifier. For extracting the comments on the scan document image, the scan document image and the source document are compared. Such comments extraction process can be performed for each of multiple scan document images, and thus respective sets of comments can be extracted from the multiple corresponding scan document images. The multiple sets of comments can be combined and saved, with proper attribution of the author of the set of comments, as a single comments content file, to be superposed on the image of the source document, upon demand, or dynamically added in a document review user interface, superposed on the image of the source document displayed therein.

BRIEF DESCRIPTION OF THE DRAWINGS

The aforementioned and other aspects, features and advantages can be more readily understood from the following detailed description with reference to the accompanying drawings wherein:

FIG. 7A shows an example of a user interface screen that can be provided by an application including a document editor function;

FIG. 16 shows an example of a table associating review file and comments content with source document;

DETAILED DESCRIPTION

Figure 1:
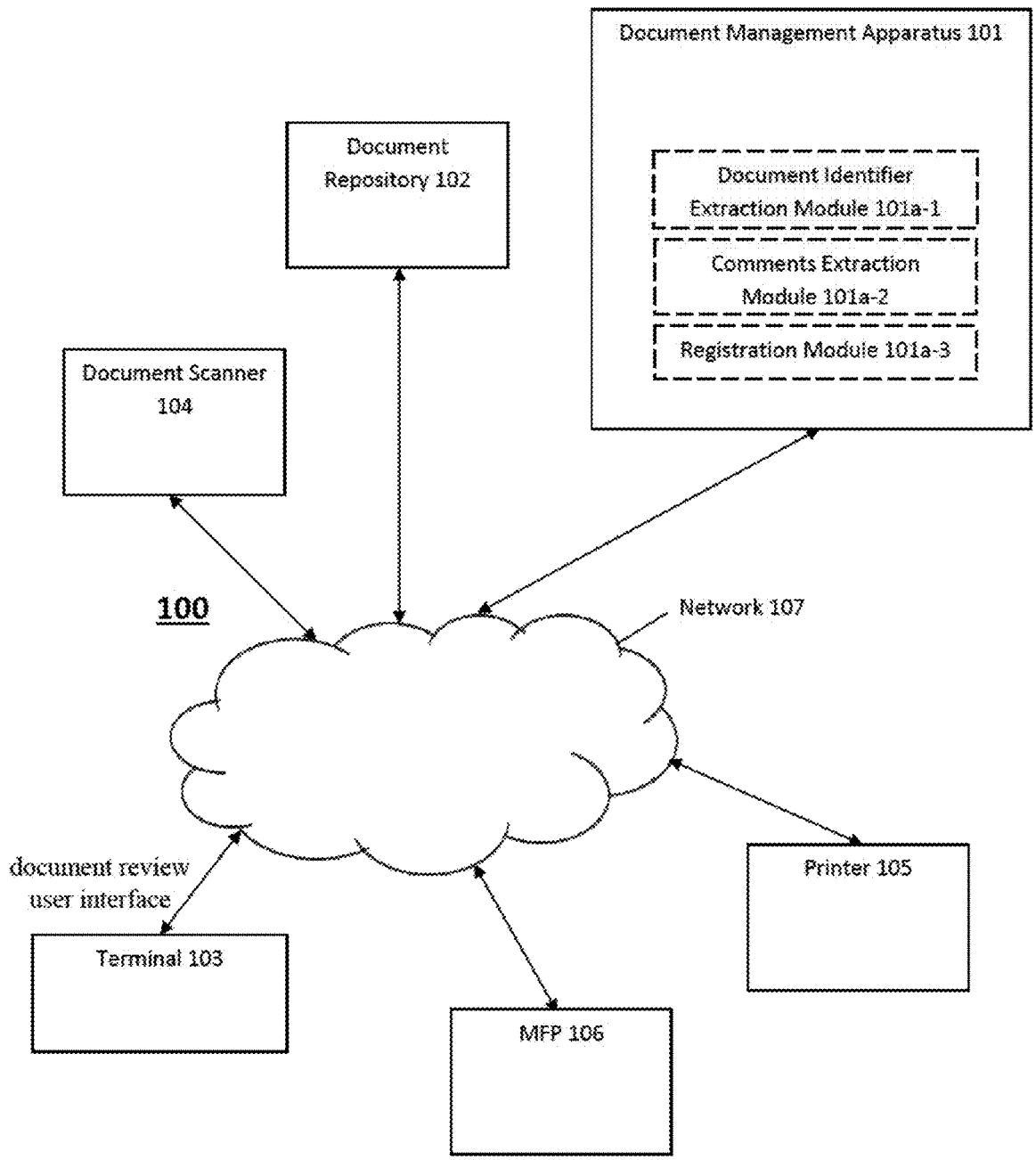
FIG. 1 shows a block diagram of a system in which a document management apparatus is configured to manage and organize multiple copies or versions of a document and/or notes or comments handwritten or electronically superposed on the document or entered in a document file, in accordance with an exemplary embodiment.

In describing preferred embodiments illustrated in the drawings, specific terminology is employed herein for the sake of clarity. However, this disclosure is not intended to be limited to the specific terminology so selected and it is to be understood that each specific element includes all technical equivalents that operate in a similar manner. In addition, a detailed description of known functions and configurations is omitted from this specification when it may obscure the inventive aspects described herein.

Various tools to facilitate document processing, management and organization are discussed herein, with reference to examples in which a software application has a document management function and/or a document editor function. It should be appreciated by those skilled in the art that any one or more of such tools may be embedded in the application and/or in any of various other ways, and thus while various examples are discussed herein, the inventive aspects of this disclosure are not limited to such examples described herein.

Referring now to the drawings, wherein like reference numerals designate identical or corresponding parts throughout the several views, FIG. 1 shows schematically a system 100, according to an exemplary embodiment, including document management apparatus 101, document repository 102, terminal 103, document scanner 104, printer 105 and MFP 106, all of which are interconnected by a network 107.

The document management apparatus 101 can be any computing device such as, for example, server that manages documents. To facilitate the management of documents, the document management apparatus 101 may be connected to a document repository which can store one or more documents. Some examples of source documents that may be stored in a document repository are documents created via an application (e.g., Microsoft Office Suite, Adobe Acrobat, iWork, Polaris Office, etc.) on a terminal (e.g., terminal 103) of the user. Once a source document has been created, the author may elect to store the source document in the repository, and the document management apparatus 101 may register metadata (e.g., document name, username, date of creation, size, etc.) corresponding to the source document, in connection with the source document. Thus, when another user who is able (with permission) to access the document in the repository of the document management apparatus 101 views the source document, such user can review the source document, and optionally add comments regarding the document.

When such user is able to view and make an electronic copy of such source document on the user's terminal (e.g., downloading the source document onto their terminals), the user may be permitted to add comments to the local copy of the source document. The electronic comments may be in any of various formats depending on the application used to open the copy of the source document in. For example, an application may include provisions for the user to enter comments in a displayed field and to associate such field with a location in the source document specified by user-applied graphical marker or indicator.

After such user is satisfied with the electronic comments he or she has added, the other user may save the copy of the source document into the repository of the document management apparatus 101 which designates the copy of the source document as a review document. As with the source document, document management apparatus 101 may also register metadata associated with the review document. Such metadata may include information regarding the user who created the review document and the source document from which the review document originated.

In the system 100, the document management apparatus 100 may be configured by software (e.g., stored in memory of the document management apparatus 101 and/or downloaded from an external source.) to include a comments extraction module 101*a*-2, a registration module 101*a*-3 and an optional document identifier extraction module 101*a*-1.

The optional document identifier extraction module 101*a*-1 obtains a document identifier from a scan document image. For example, users may print out a physical copy (i.e. hardcopy) of a particular source document in order to add written comments to the printed copy of the source document by using a physical medium (e.g., pencil, pen, marker, brush, crayon, oil pastel, etc.) as opposed to adding comments electronically using an application. The printed physical copy may include a document identifier (e.g., QR code, bar code, etc.) which may contain information that associates the physical copy with the particular source document. It should be noted that the document identifier is typically not placed on the original source document, but is instead is added when the copy of the source document is printed. It should also be noted that the document identifier is not limited to only being placed on a printed physical copy of the source document. In other words, when a user creates an electronic copy of the source document, the document identifier may also be placed on the electronic copy.

When a user wishes to store the printed copy of the source document onto the repository of the document management apparatus 101, the user may scan the hardcopy document, via a scanner (e.g., document scanner 104 or MFP 106 of FIG. 1), into an electronic form. After the user has scanned the printed copy of the source document into a scan document image and stored the scan document image into the document repository of the document management apparatus 101, the document identifier extraction module 101*a*-1 detects that there is a document identifier on the scan document image and automatically extracts (i.e. obtains) the document identifier from the scan document image. Next, the document identifier extraction module 101*a*-1 determines the identity of the particular source document from which the scan document image is derived from.

The comments extraction module 101*a*-2 analyzes the scan document image after the document identifier extraction module 101*a*-1 determines the identity of the source document with which the scan document image is associated. In such analysis, the comments extraction module 101*a*-2 compares the scan document image with the associated source document. By performing the comparison, the comments extraction module 101*a*-2 can determine which parts of the scan document image are written comments added by the user and which parts of the scan document image are originally part of the associated source document. After the comparison is made, the comments extraction module 101*a*-2 obtains the written comments and determines position of the written comments.

In an exemplary embodiment, the position of the written comments is the location at which the written comments are disposed on the scan document image. In another exemplary embodiment, the written comments may be extracted as an overlay image. In other words, the written comments may be extracted by the comments extraction module 101*a*-2 as image overlay data in order to replicate the written comments as exactly as how the comment appears on the hardcopy associated with the scan document image. In yet another exemplary embodiment, the comments extraction module 101*a*-2 may convert the written comments into electronic text.

The comments extraction module 101*a*-2 may extract the comments by conventional edge detection methods. In such approach, the comments extraction module 101*a*-2 processes the scan document image pixel-by-pixel and compare the brightness of each pixel with neighboring pixels, proceeding outward from the selected pixel. In doing so, if a particular adjacent pixel has a brightness value that is significantly greater or less than the selected pixel (e.g., difference in value exceeding a threshold value), the adjacent pixel may be determined to be an edge pixel delimiting a comment. Once all of such edge pixels are determined, the comment can be recognized. Such a process can be repeated until the comments extraction module 101*a*-2 has examined all of the pixels in the scan document image, to extract one or more comments from the scan document image. However, the algorithm used by the comments extraction module 101*a*-2 is not limited to the one discussed above, and another conventional detection method (e.g., Canny edge detection algorithm) may be used to extract comments from the scan document image.

The registration module 101*a*-3 performs automatic management of the documents that are stored in the document repository. In other words, whenever a user uploads or stores any type of document (e.g., source document, electronic review document, etc.) onto the repository, the registration module 101*a*-3 may automatically determine (i) whether the uploaded document is a source document or a review document, (ii) a location within the repository to store the document, and (iii) metadata to be associated with the uploaded document.

For example, in a case in which the uploaded document is a particular source document, the registration module 101a-3 may automatically create a new folder in the repository for the particular source document to be stored in. Any review documents (e.g., handwritten or electronic) associated with the particular source document may be automatically placed in the same folder whenever the review documents are uploaded. In another example, in a case in which the uploaded document is an electronic review document (i.e. a copy of the source document with handwritten/electronic comments), the registration module 101a-3 may receive comments content from the comments extraction module 101a-2. Subsequently, the registration module 101a-3 may create a separate file specifically for the comments content and store the comments content file in the same folder as the particular source document.

In an exemplary embodiment, when the registration module 101a-3 determines that the uploaded document is an electronic review document and registers such electronic review document into the document repository, the registration module 101a-3 informs the comments extraction module 101a-2 that a review document has been registered thereby causing the comments extraction module 101a-2 to extract the comments and their respective positions from the review document as comments content. After the comments content have been extracted, the comments extraction module 101a-2 passes the comments content to the registration module 101a-3 which proceeds to add the comments content as metadata to the electronic review document. Thus, in this case there may not be a separate file for the comments content as the comments content information is integrated with the electronic review document as metadata.

Figure 2A:
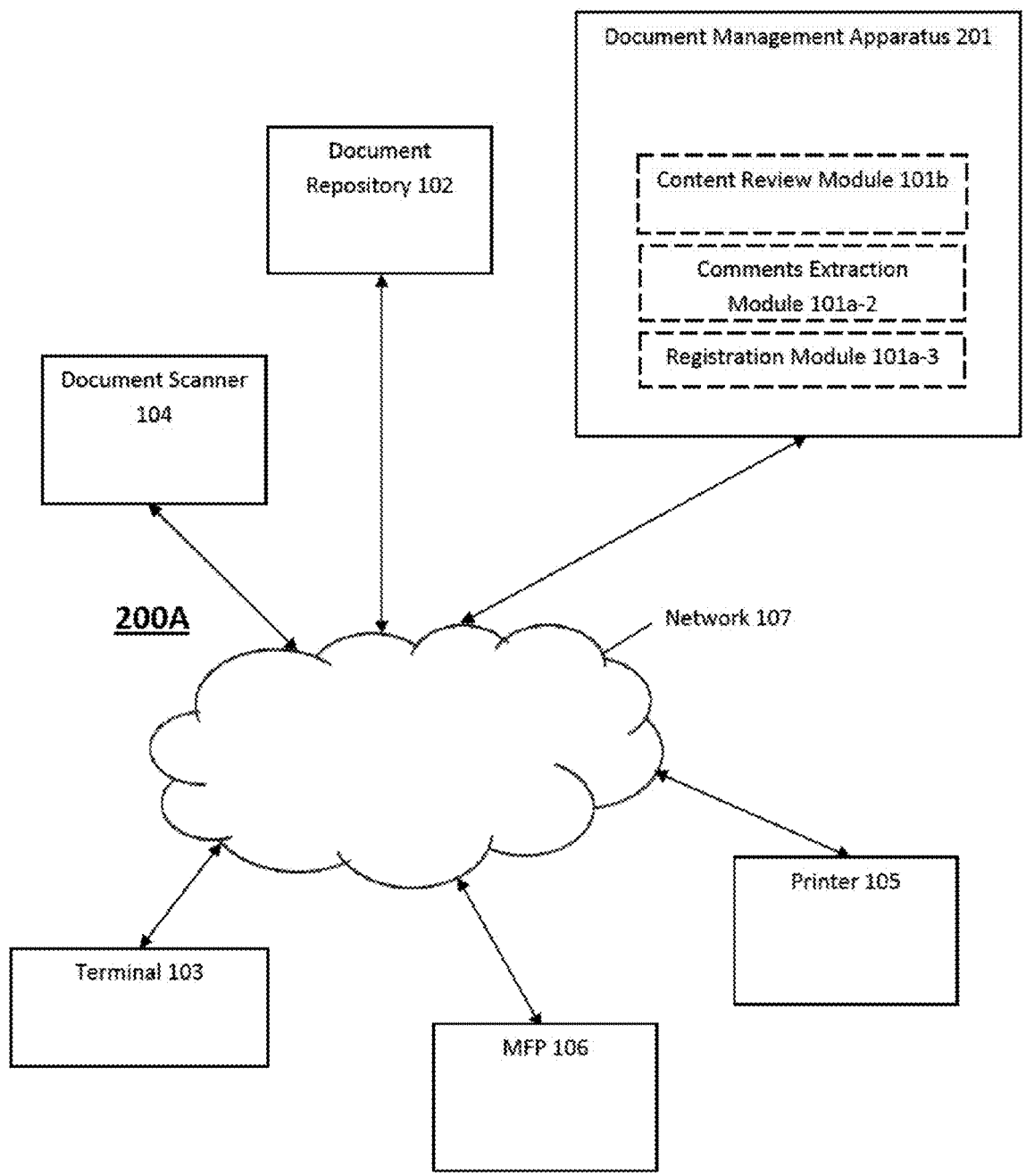
FIG. 2A shows a block diagram of a system in which a document management apparatus is configured to manage and organize multiple copies or versions of a document and/or notes or comments handwritten or electronically superposed on the document or entered in a document file, according to another exemplary embodiment.
Figure 2B:
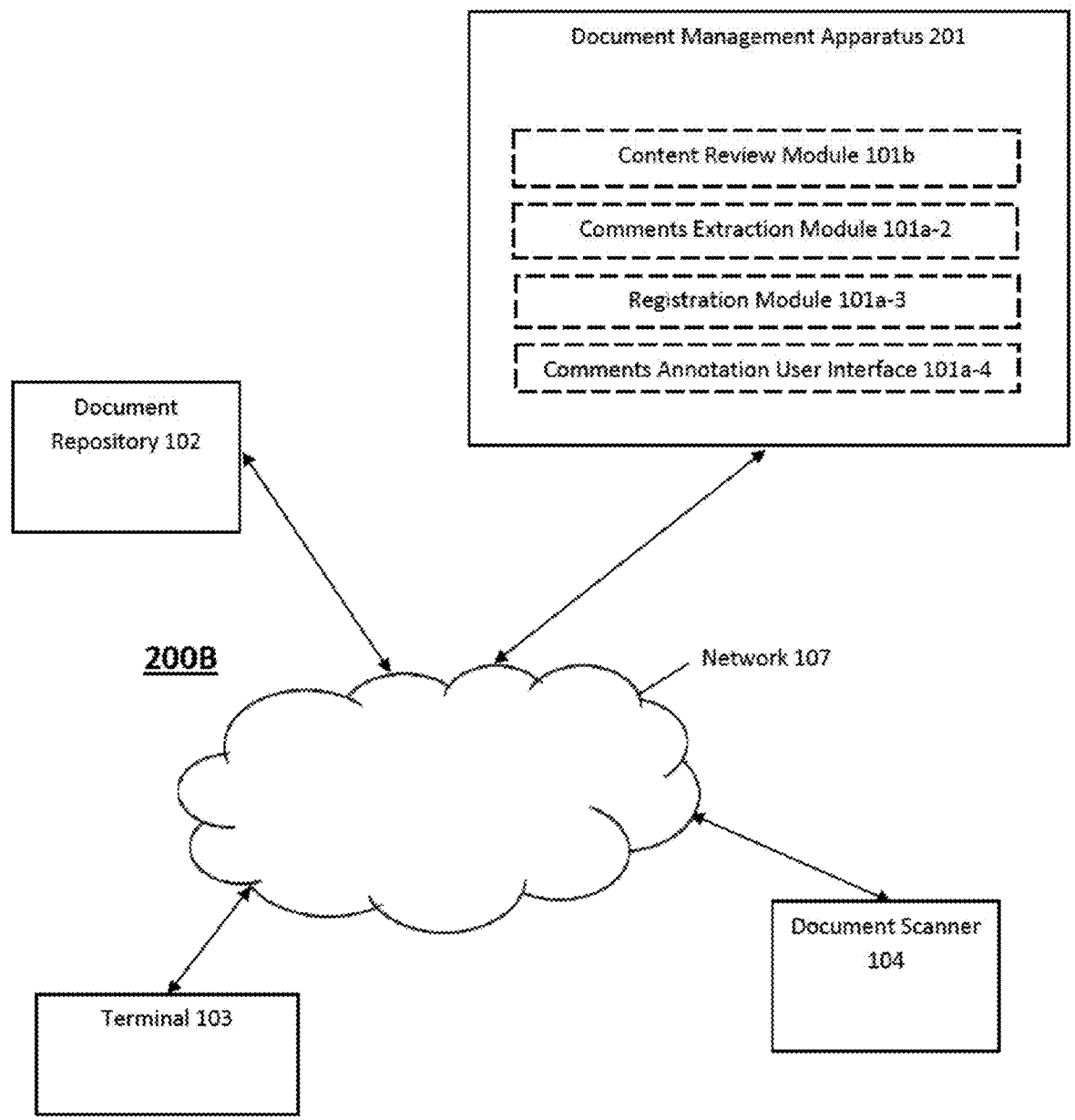
FIG. 2B shows a block diagram of a system in which a document management apparatus is configured to manage and organize multiple copies or versions of a document and/or notes or comments handwritten or electronically superposed on the document or entered in a document file, according to another exemplary embodiment.
Figure 2C:
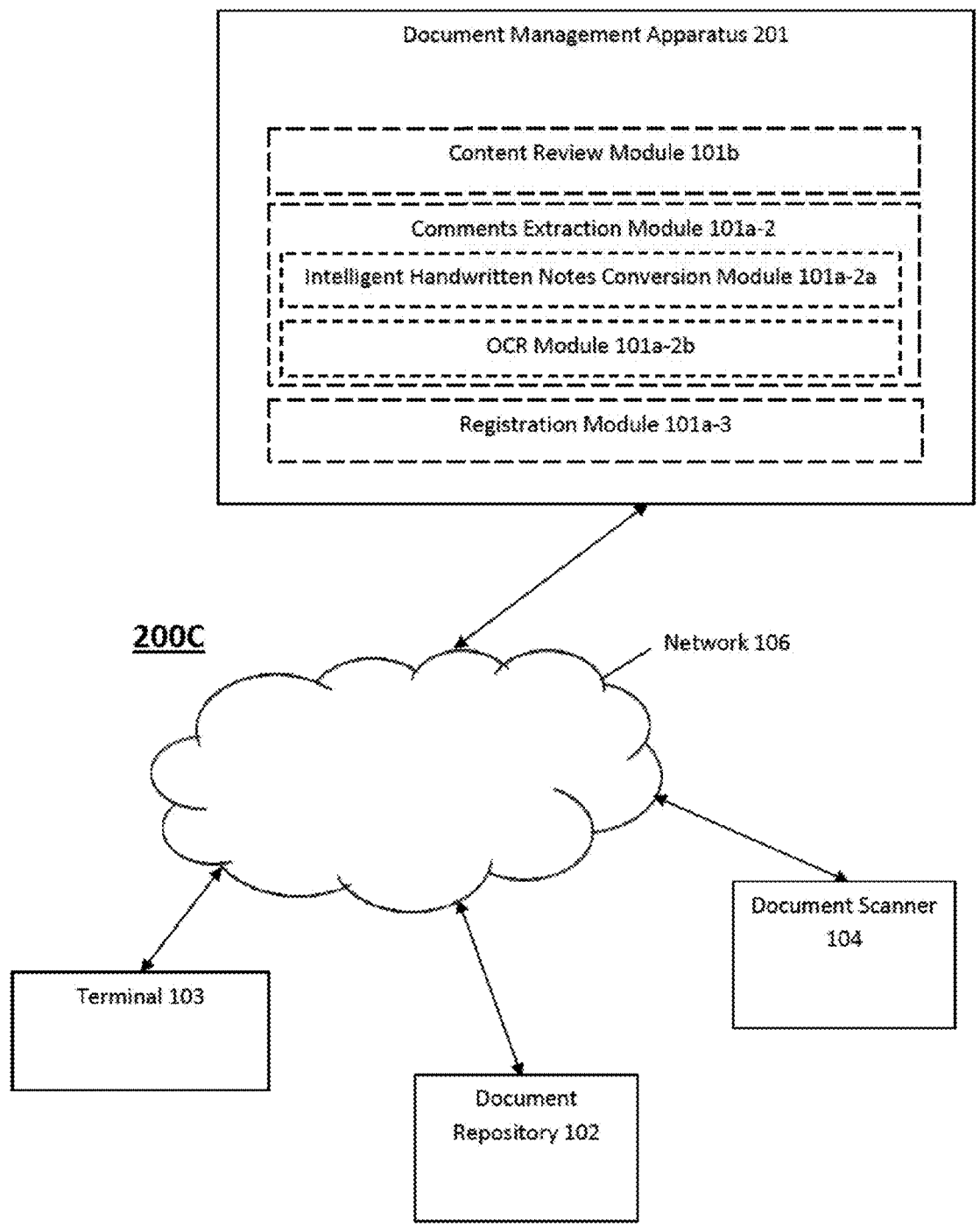
FIG. 2C shows a block diagram of a system in which a document management apparatus is configured to manage and organize multiple copies or versions of a document and/or notes or comments handwritten or electronically superposed on the document or entered in a document file, according to another exemplary embodiment.

The document repository 102 may be a database that stores one or more documents and may be accessible by users of the terminal 103 via a content review module (e.g., 101b in FIGS. 2A, 2B, 2C) of the document management apparatus (e.g., 201 in FIGS. 2A, 2B, 2C). Further, the document repository 102 may also store electronic or handwritten comments that are associated with other documents stored in the document repository 102.

The terminal 103 can be any computing device, including but not limited to a personal, notebook or workstation computer, a kiosk, a PDA (personal digital assistant), a mobile phone or handset, another information terminal, etc., that can communicate with other devices through the network 107. The terminal 103 is further described infra with reference to FIG. 4.

The terminal 103 may have applications (e.g., Microsoft Office Suite, Adobe Acrobat, iWork, Polaris Office, etc.) stored thereon that provide a user of the terminal 101 with the ability to create different types of documents (e.g., .doc, .docx, .pdf, .jpeg, .gif, etc.). Further, the terminal 102 may also be able to access the document management apparatus 101 and the document management application 101a provided thereon via the network 107. For example, the user of the terminal 103 may create an original document via an application on his or her terminal 103 and upload such original document to the repository of the document management apparatus 101. In another example, the user may also download another source document (created by another user) to the terminal 103.

The document scanner 104 can be any device which scans documents (such as copies of source documents) into a scan document image. The document scanner 104 may include the document management application 101a or may include portions of the document management application 101a. Thus, when the document scanner 104 generates a scan document image, it may be possible for the document scanner 104 to extract a document identifier (if any) from the scan document image. As a result, the document scanner 104 can automatically inform the document management apparatus 101 of the location to place the scan document image without any manual input by the user.

The terms "printer" and "printer device" are used hereinafter generically to include any output device having a printing or plotting functionality, and include multifunction devices having a copy and/or scanning functionality in addition to the printing or plotting functionality.

Figure 5:
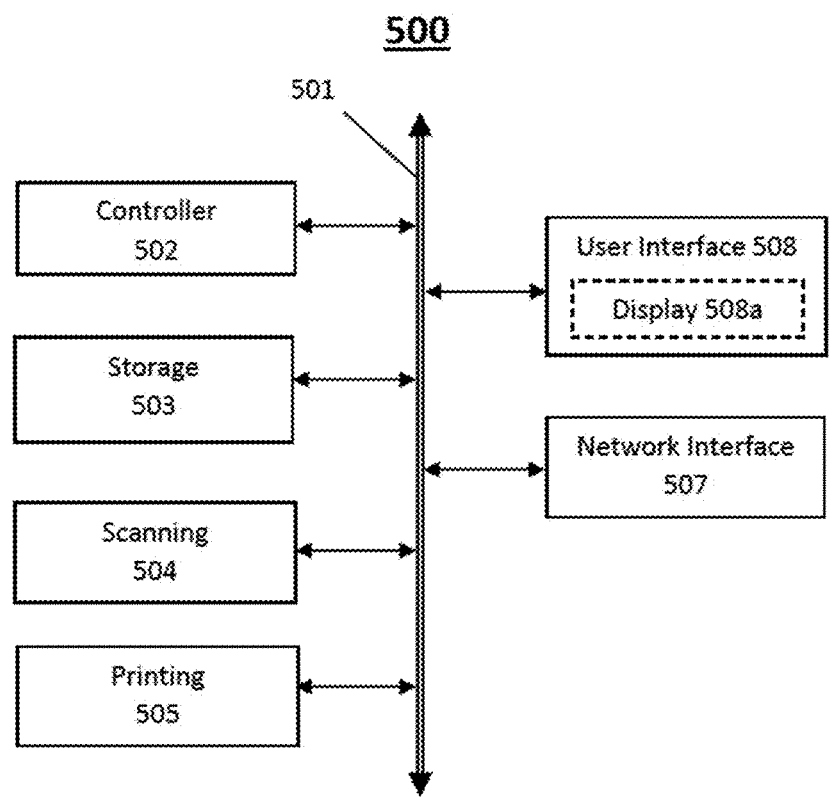
FIG. 5 shows a block diagram of an exemplary configuration of a multi-function device including a document scanner.

The MFP 106 can be, for example a printer/scanner, printer/scanner/fax, etc. While this example of this disclosure simply refers to a single MFP 106 and a single printer 105 in the interest of brevity, it should be appreciated that the network environment can have an arbitrary number of printer and MFP devices. The MFP 106 may be configured as shown in FIG. 5, discussed infra.

The network 107 can be a local area network, a wide area network or any type of network such as an intranet, an extranet (for example, to provide controlled access to external users, for example through the Internet), a private or public cloud network, the Internet, etc., or a combination thereof. In addition, the network 107 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

While the modules of the document management apparatus 101 discussed with reference to the embodiment shown in FIG. 1 largely perform backend processing of the documents in the document repository, in connection with managing the documents in the document repository, such document management apparatus may additionally provide a user interface (e.g., in or as part of a client application, a web page, etc.) to a user terminal to provide facilities and functions for a user to access documents in, and register documents to, the repository, and in addition to various other facilities and functions, not shown in the drawings.

FIG. 2A shows a system 200A including such a document management apparatus 201, according to another exemplary embodiment. The document management apparatus 201 is similar to the document management apparatus 101 of FIG. 1 except that a content review module 101b is additionally provided in the document management apparatus 201.

The content review module 101b is configured to provide, when requested, the comments extracted by the comments extraction module 101a-2 and/or the comments content registered by the registration module 101a-3. As discussed further in more detail infra, the extracted comments or comments content can be returned in any of many different manners, as the circumstance requires or the user requests. In various different circumstances, the document review user interface may show the source document, one or more selected sets of comments content, or a combination thereof.

For example, the content review module 101b may retrieve the comments content from the document repository and superpose the registered comments on an image of the source document, in a document review user interface provided upon request. Such comments retrieved from the document repository may be image or text, and when the retrieved comments is text, the text may be rendered according to the registered position associated with the text and in a manner that is predetermined or user-specified. Further, multiple sets of reviewer's comments may be registered in association with the source document and may be retrieved upon request and superposed on the image of the source document, in the document review user interface. On the other hand, the retrieved comments may be in the form of an image capturing handwritten notes, and such image may be superposed on the image of the source document, in the document review user interface. In another circumstance, the image of the handwritten notes may have undergone OCR and/or handwriting processing and converted to handwriting-converted text, and such handwriting-converted text is superposed.

FIG. 2B shows schematically a system 200B, according to another exemplary embodiment. The system 200B is similar to the system 200A of FIG. 2A except that a comments annotation user interface 101a-4 is provided in the document management apparatus 201.

The comments annotation user interface 101a-4 permits a user to input comments into the electronic review document. For example, the comments annotation user interface 101a-4 may have graphical markers or indicators (e.g., text box, speech bubble, thought bubble, etc.) which allows a user to type comments. In another example, the comments annotation user interface may also allow users to draw or write via an electronic stylus comments. It should be noted that such comments inputted by the user via the comments annotation user interface 101a-4 are associated as metadata of an electronic review document with the source document.

Otherwise, operations of the elements of the system 200B are similar to those discussed in connection with the corresponding elements of the system 200A of FIG. 2A.

FIG. 2C shows schematically a system 200B, according to another exemplary embodiment. The system 200C is similar to the system 200A of FIG. 2A except that the comments extraction module 101a-2 additionally includes an intelligent handwritten notes conversion (IHNC) module 101a-2a and an optical character recognition (OCR) module 101a-2b.

The intelligent handwritten notes conversion module (IHNC) module 101a-2a determines whether there are any comments that are handwritten in the extracted comments. If there exists any handwritten comments, the IHNC 101a-2a converts the handwritten comments into text. However, it should be noted that because the handwriting of each person is different, the IHNC 101a-2a may have difficulty in converting handwritten comments, especially if they are in script (i.e. cursive). Thus, there may be a mechanism in which the IHNC 101a-2 learns the handwriting style of each person.

The OCR module 101a-2b recognizes letters that may be written in printed form (i.e. not cursive). For example, the OCR module 101a-2b may recognize that one or more of the extracted comments include text. However, the printed text, in an exemplary embodiment, may be in image format. Thus, the OCR module 101a-2b converts the printed text into type-converted text. In addition, the OCR module 101a-2b may also pass the type converted text as metadata to the registration module 101a-3.

Otherwise, operations of the elements of the system 200C are similar to those discussed in connection with the corresponding elements of the system 200A of FIG. 2A.

Figure 3:
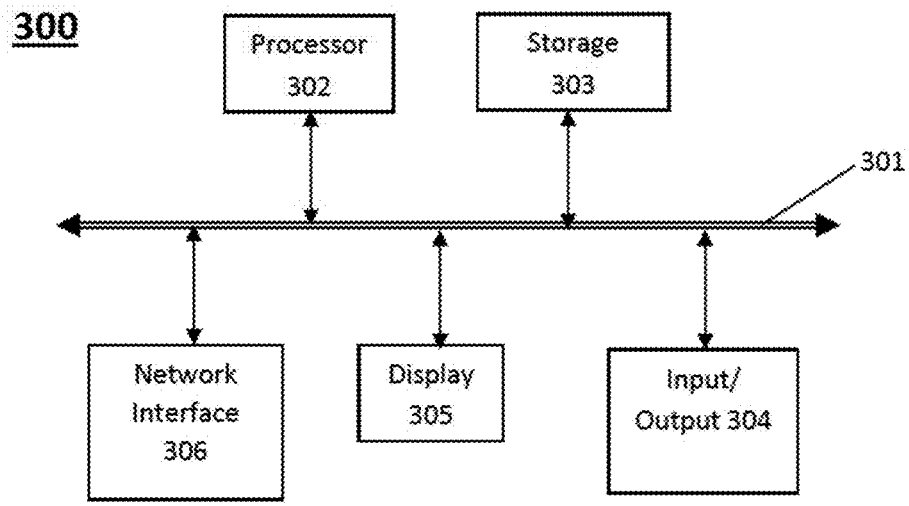
FIG. 3 shows a block diagram of an exemplary configuration of a computing device.

FIG. 3 shows an exemplary constitution of a computing device that can be configured (for example, through software) to operate (at least in part) as the document management apparatus (101 in FIG. 1; 201 in FIGS. 2A-2C). In FIG. 3, apparatus 300 includes a processor (or central processing unit) 302 that communicates with a number of other components, including memory or storage device 303, other input/output (e.g., keyboard, mouse, etc.) 304, display 305 and network interface 306, by way of a system bus 301. The apparatus 300 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as should be appreciated by those skilled in the relevant art.

In the management apparatus 300, the processor 302 executes program code instructions that control device operations. The processor 302, memory/storage 303, input/output 304, display 305 and network interface 306 are conventional, and therefore in order to avoid obfuscating the inventive aspects of this disclosure, such conventional aspects are not discussed in detail herein.

The apparatus 300 includes the network interface 306 for communications through a network, such as communications through the network 107. However, it should be appreciated that the subject matter of this disclosure is not limited to such configuration. For example, the apparatus 300 may communicate with user terminals through direct connections and/or through a network to which some components are not connected. As another example, the apparatus 300 does not need to be provided by a server that services terminals, but rather may communicate with the devices on a peer basis, or in another fashion.

The apparatus 300 of the present disclosure is not limited to a server or computer, but can be manifested in any of various devices that can be configured to communicate over a network and/or the Internet.

Figure 4:
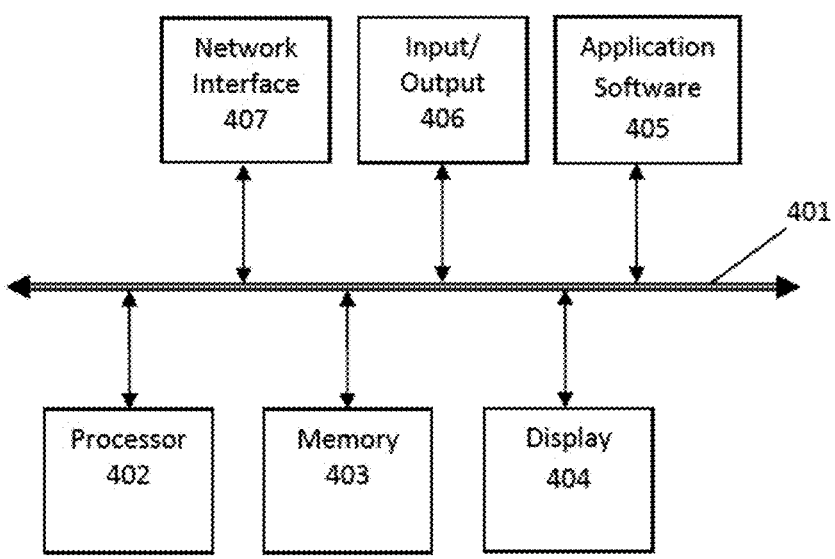
FIG. 4 shows a block diagram of an exemplary configuration of a terminal.

An exemplary constitution of the terminal apparatus 103 of FIGS. 1, 2A, 2B, 2C is shown schematically in FIG. 4. In FIG. 4, terminal 400 includes a processor (or central processing unit) 402 that communicates with various other components, such as memory (and/or other storage device) 403, display 404, application software 405, input/output (such as keyboard, mouse, touchpad, stylus, microphone and/or speaker with voice/speech interface and/or recognition software, etc.) 406 and network interface 407, by way of an internal bus 401.

The memory 403 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 407 provides a connection (for example, by way of an Ethernet connection or other network connection which supports any desired network protocol such as, but not limited to TCP/IP, IPX, IPX/SPX, NetBEUI, etc.) to the network to which the computer 400 is connected (e.g., network 107 of FIGS. 1, 2A, 2B, 2C).

Additional aspects or components of the computer 500 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

FIG. 5 shows a schematic diagram of a configuration of an MFP (multi-function printer or multi-function peripheral), which can be any apparatus (including a microprocessor chip or a collection of devices having varying degree of integration) that has the ability to perform document scanning and one or more additional image forming functionalities. The MFP 500 shown in FIG. 5 includes a controller 502, and various elements connected to the controller 502 by an internal bus 501. The controller 502 controls and monitors operations of the MFP 500. The elements connected to the controller 502 include storage 503 (for example, random access memory, read-only memory, hard disk drive, portable storage media drive such as for optical discs, magnetic discs, magneto optical discs, etc., semiconductor memory cards, combinations of storage media, etc.), scanning 504, printing 505, a network interface (I/F) 507 and a user interface 508.

Storage 503 can include one or more storage parts or devices [e.g., a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 503 and executed by the controller 502 to carry out the instructions. Such instructions can include instructions for performing specified functions (such as printing, scanning, faxing, copying, e-mailing, etc.) of the MFP 500, to enable the MFP 500 to interact with a terminal, as well as perhaps other external devices, through the network interface 507, and interactions with users through the user interface 507.

The network interface 507 is utilized by the MFP 500 to communicate with other network-connected devices such as a terminal, a server and receive data requests, print jobs, user interfaces, and etc.

The user interface 508 includes one or more electronic visual displays that display, under control of controller 502, information allowing the user of the MFP 500 to interact with the MFP 500. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFP 500, so as to allow the operator to interact conveniently with services provided on the MFP 500, or with the MFP 500 serving as terminal for accessing electronic data or other content through the network. User interfaces or other contents received through the network via the network interface 507 can be displayed on the display screen.

The display screen does not need to be integral with, or embedded in, a housing of the MFP 500, but may simply be coupled to the MFP 500 by either a wire or a wireless connection. The user I/O 508 may include keys and/or buttons (such as graphical keys or buttons, or other graphical elements, of a GUI on a touchscreen display 508a) for inputting information or requesting various operations. Alternatively, the user I/O 508 and the display screen may be operated by a keyboard, a mouse, a remote control, voice recognition, or eye-movement tracking, or a combination thereof.

Since the MFP 500 is typically shared by a number of users, and is typically stationed in a common area, the MFP 500 preferably prompts the user to supply login credentials or authentication information, such as user name (or other user or group information), password, access code, etc. The user credentials may also be stored for the session and automatically supplied if access to other devices (or assets) through the network requires it. On the other hand, such other devices may prompt the user to supply other user credentials through the user interface.

Other methods of authentication may also be used. For example, the MFP 500 may be equipped with a card reader or one or more biometrics means (such as comparing fingerprints, palm prints, voice or speech, retinas or irises, facial expressions or features, signature, etc.). The MFD 500 may communicate the user credentials, provided in the manners discussed above, to other devices or applications connected to the MFP 500 via a network (e.g., the network 107 of FIGS. 1, 2A, 2B, 2C) for determining authorization for performing jobs.

Scanning 504, printing 505, and network interface 507 are otherwise conventional, and therefore, a detailed description of such conventional aspects is omitted in the interest of clarity and brevity. The MFP 500 can have any or all of the functions of similar devices conventionally known, such as for scanning, editing and storing images, sending a fax, sending and receiving e-mails with or without attachments, accessing files by FTP or another protocol or facility, surfing the Web, scan-to-folder, scan-to-email, etc. Further, multi-functional devices or multi-function peripheral devices can play a prominent role to convert hardcopy documents to electronic documents.

Figure 6:
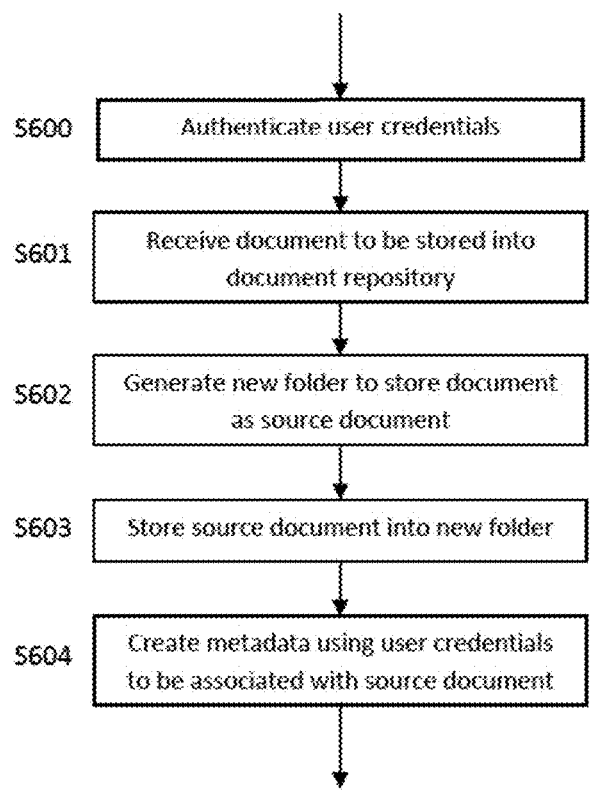
FIG. 6 shows a flow chart of a method, according to an exemplary embodiment, that can be performed in any of the systems shown in FIGS. 1, 2A, 2B and 2C.

FIG. 6 shows a method that can performed by a document management apparatus (e.g., 101 in FIG. 1; 201 in FIGS. 2A, 2B, 2C).

Figure 7B:
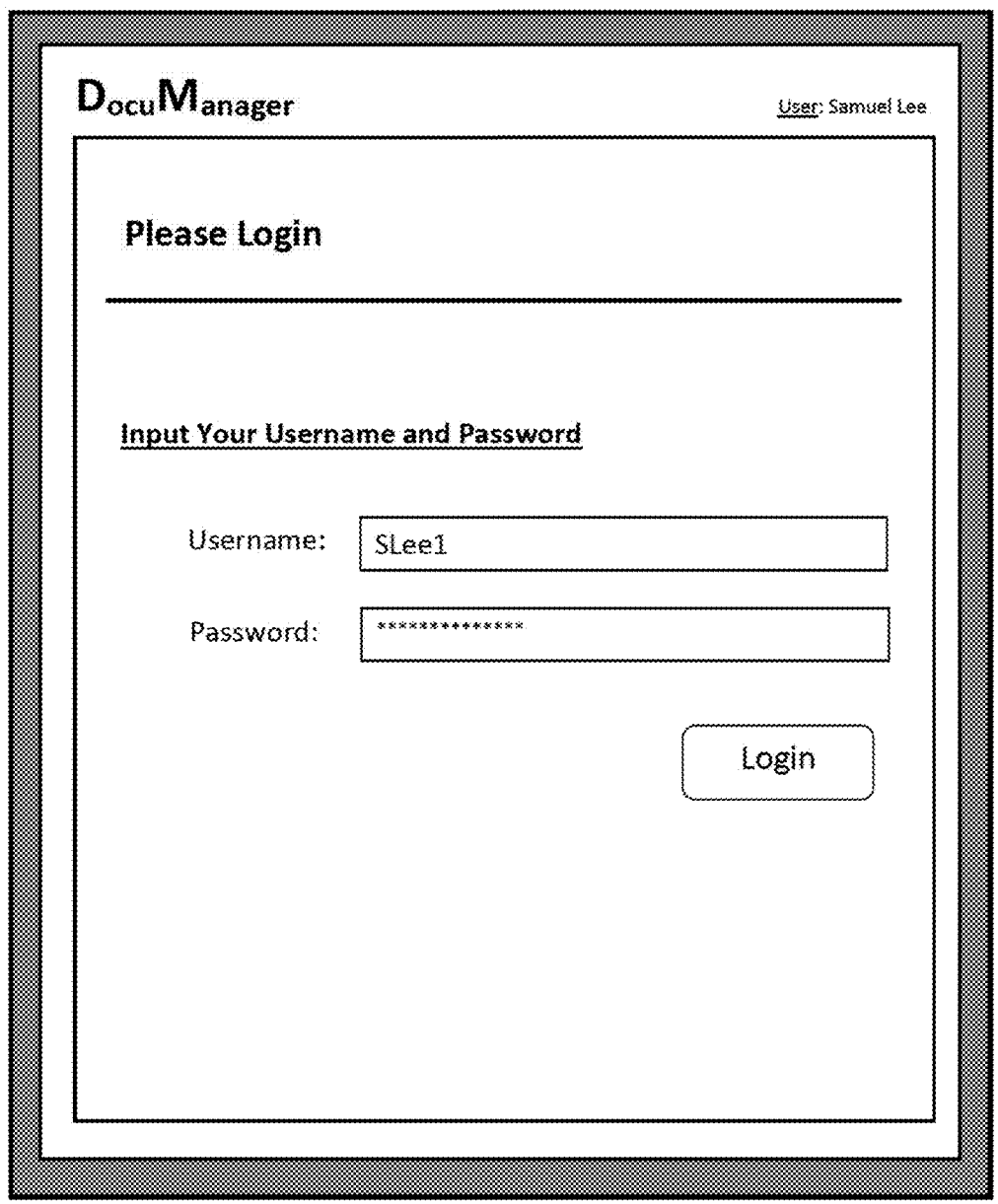
FIGS. 7B-7G show respective examples of user interface screens that can be provided by an application including a document management function.

In this exemplary scenario, a user ("Professor Samuel Lee") may be a professor at a university who teaches history to undergraduate college students. In this case, one of the classes that "Professor Lee" may be teaching is "$20^{th}$ Century European History". To assist his students in the class "$20^{th}$ Century European History", "Professor Lee" may create outlines of different weekly topics that are meant to be viewed during the corresponding lesson. For example, in the example shown in FIG. 7A, "Professor Lee" has created an outline, via an application ("Document Editor X") on his terminal (e.g., terminal 103), for a weekly topic which in this case is "World War I". As can be seen, the "World War I" outline does not intentionally contain detailed information regarding aspects of "World War I". The students may be motivated to fill in the details on their copy of the "World War I" outline when attending "Professor Lee's" lecture. Once "Professor Lee" has completed creating the "World War I" outline, he may store the outline at a location in his terminal.

To distribute the "World War I" outline to students in the "$20^{th}$ Century European History" class, "Professor Lee" may upload the outline to be stored in a document repository (e.g., document repository 102) which allows the outline to be accessible to his students. To facilitate this upload, "Professor Lee" may first access a document management application (e.g., document management application 101a) on a document management apparatus (e.g., 101) by inputting user credentials, such as in the example shown in FIG.

Figure 7C:
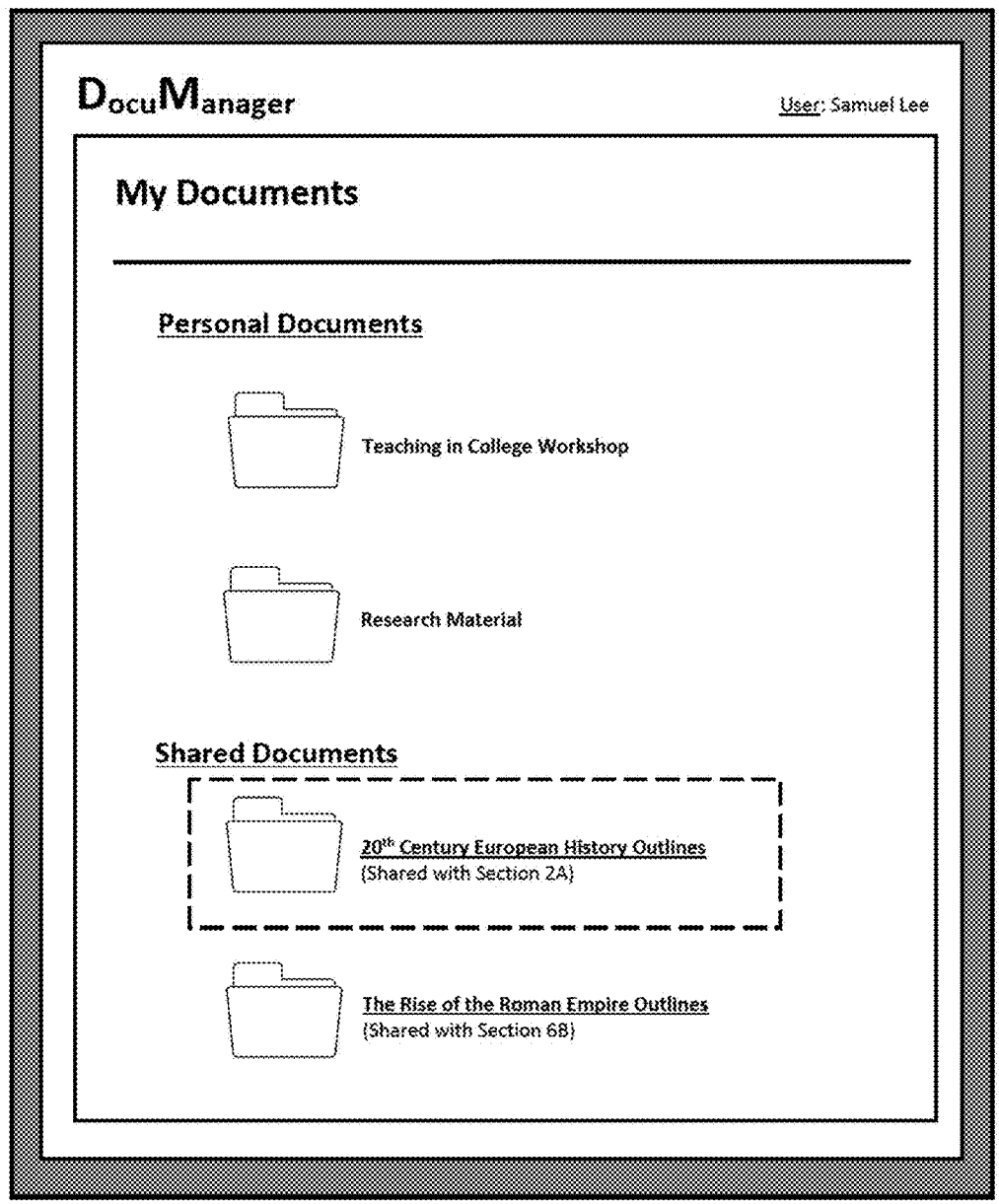
Figure 7D:
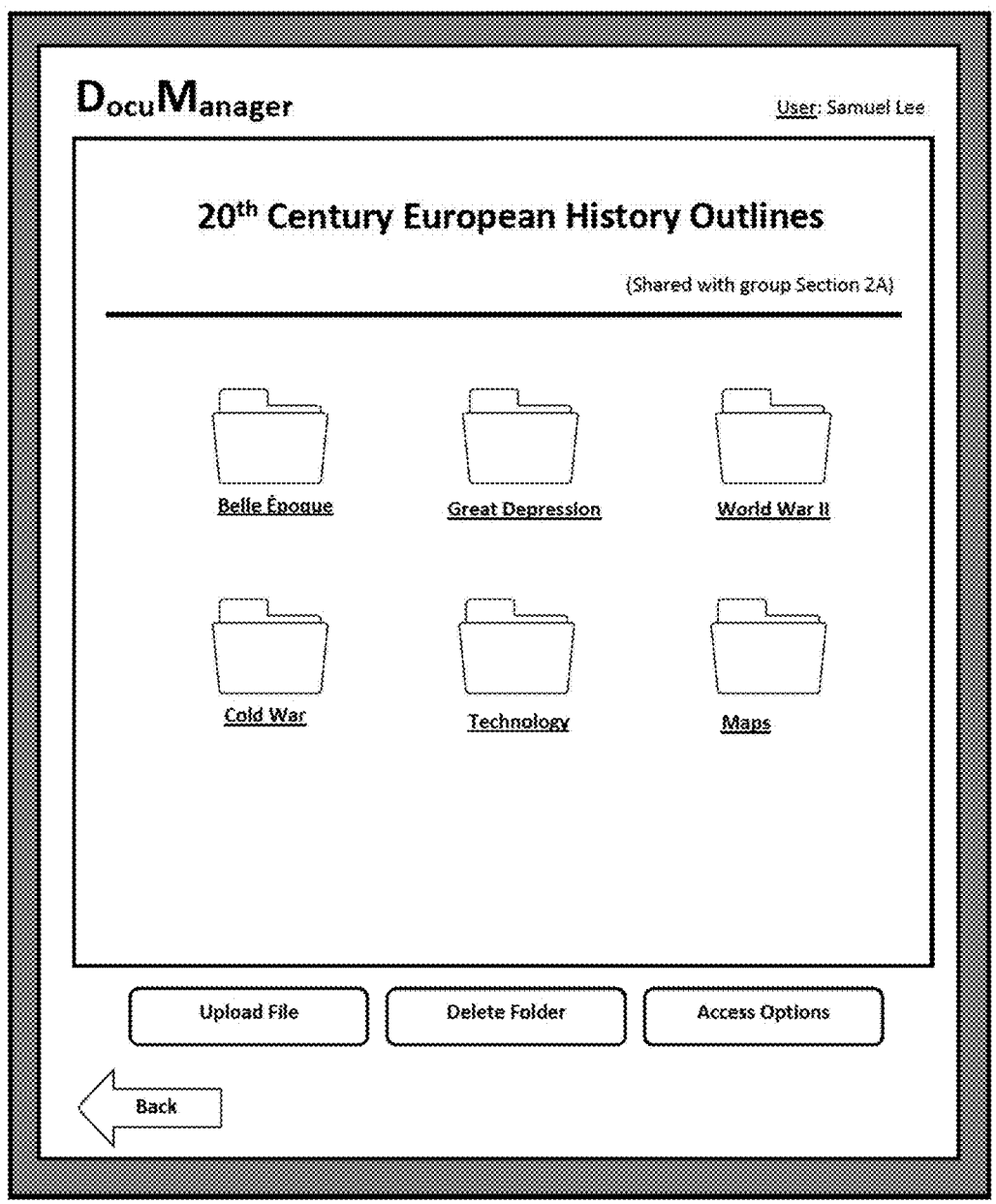

7B. Next, the document management application authenticates the user credentials (step S600). Then, the document management application presents a screen, such as illustrated in FIG. 7C, in which "Professor Lee" is shown folders containing documents in the document repository that are not shared ("Personal Documents") and folders containing documents in the repository that may be shared with others ("Shared Documents"). In this case, since "Professor Lee" intends to distribute his outline to students in his "20$^{th}$ Century European History" class, he enters the corresponding folder. Next, the document management application presents "Professor Lee" with folders (e.g., "Great Depression", "World War II", etc.) that correspond to previous weekly topics in the "20$^{th}$ Century European History" class, such as shown in FIG. 7D.

It should be noted that each folder may contain a single original document (i.e. source document) and corresponding electronic review documents. In other words, such source document may be a single original outline that has been uploaded by "Professor Lee". Thus, each folder (e.g., "Great Depression", "World War II", etc.) may not contain different types of documents with various topics, but instead include a single source document and corresponding electronic review documents which are copies of the source documents that contain electronic or written comments. For example, students in "Professor Lee's" class may each print out a copy of a "Cold War" outline and write notes onto it. In an act of collaboration between the students, each may scan and upload their copies of the "Cold War" outline to be stored in the document repository. As a result, when either "Professor Lee" or one his students open the "Cold War" folder, each may be presented with the source document (i.e. original "Cold War" outline uploaded by "Professor Lee") and possibly one or more electronic review documents uploaded by one or more of his students.

Figure 7E:
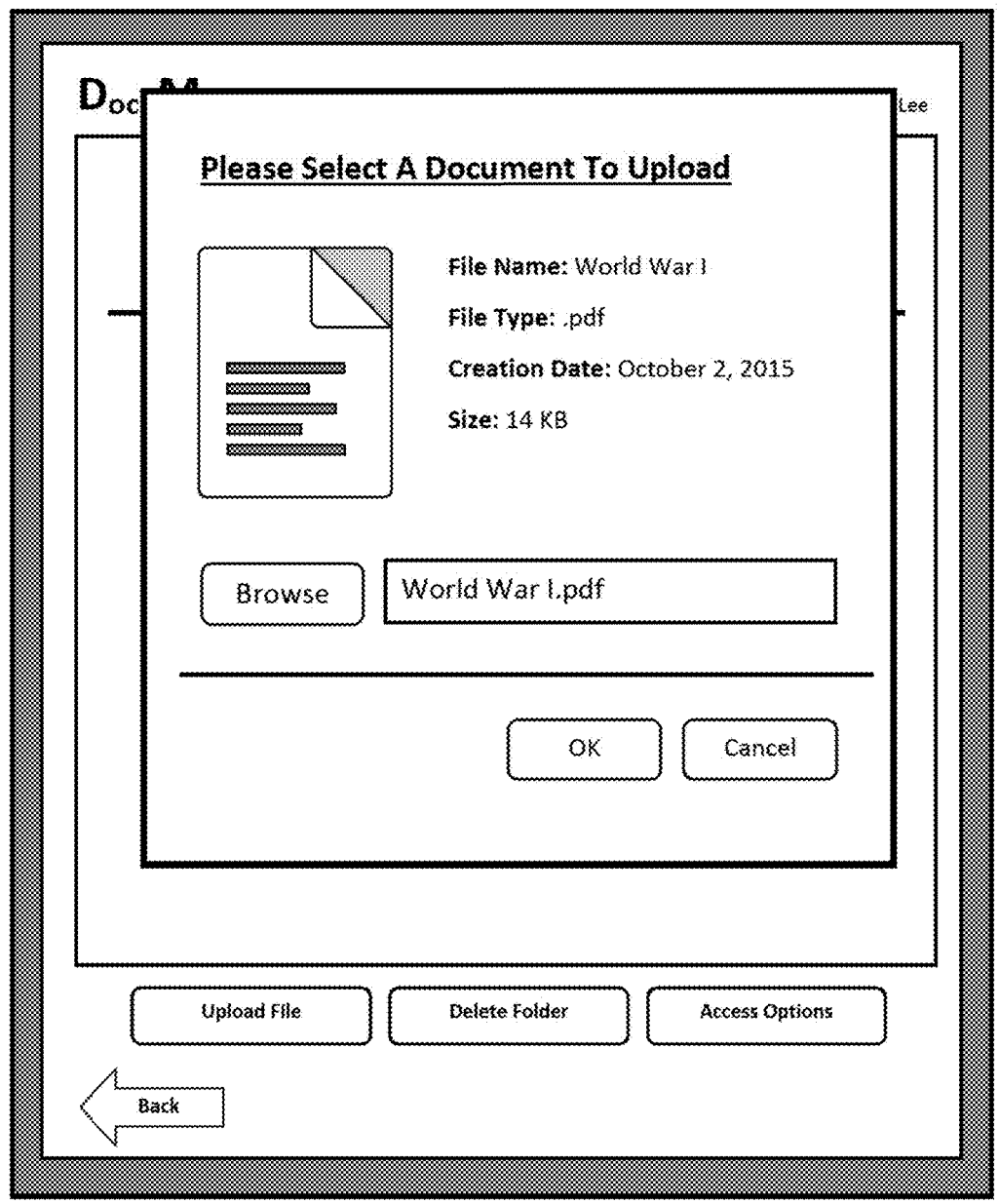
Figure 7F:
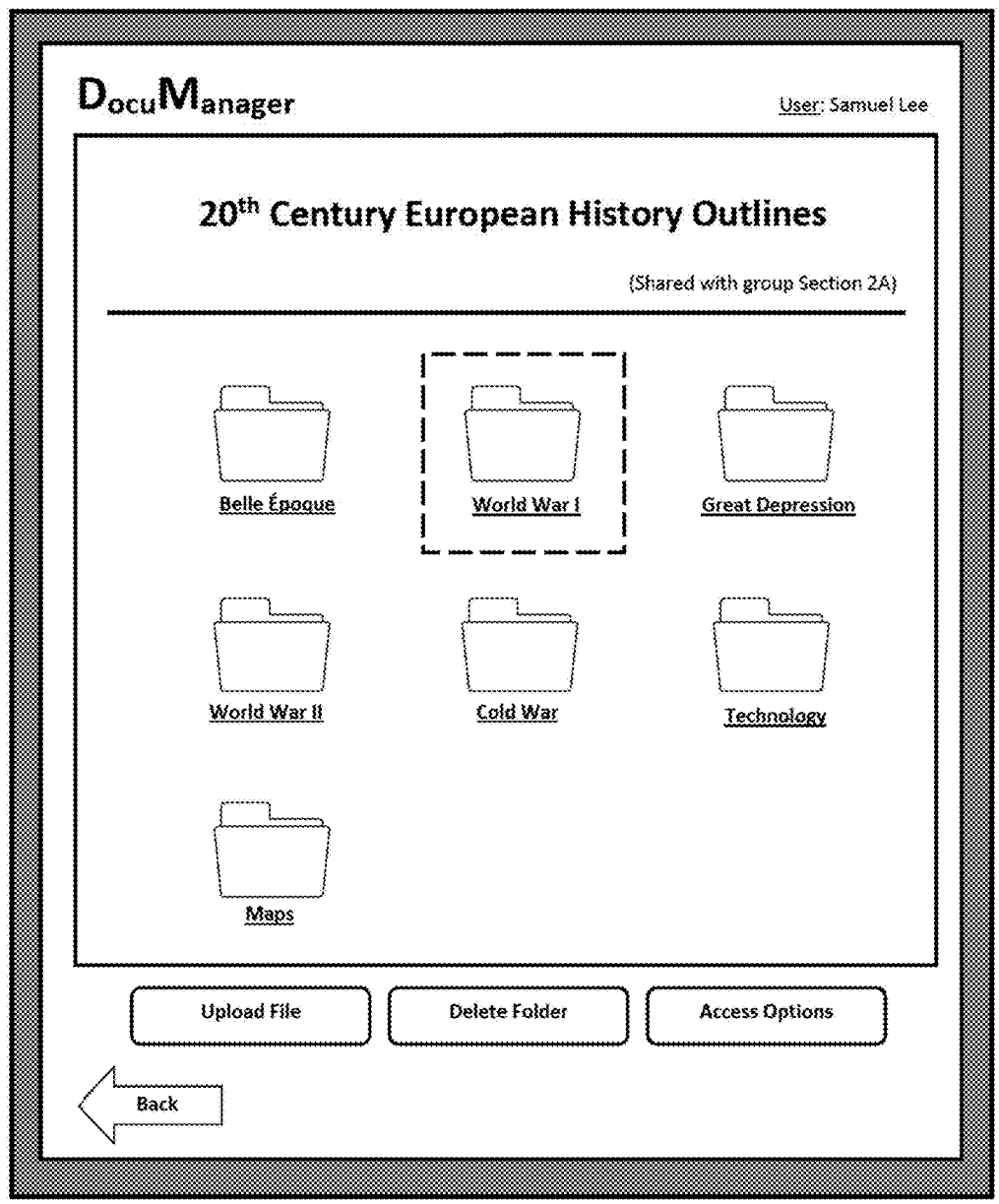
Figure 7G:
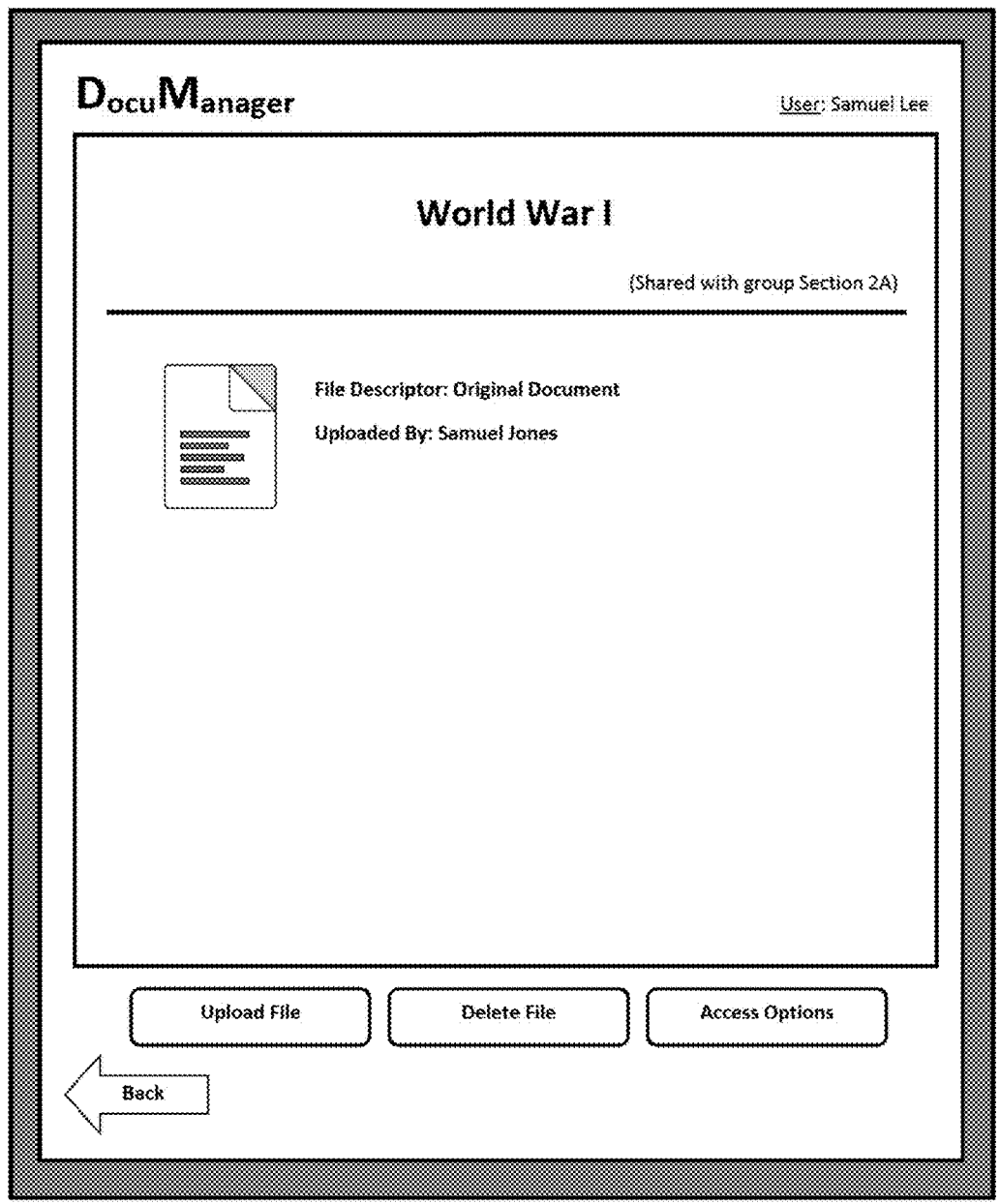

To upload the "World War I" outline, "Professor Lee" may activate the "Upload File" button which causes the document management application to present a screen for uploading files, such as shown in FIG. 7E. In this case, "Professor Lee" selects the file "World War I.pdf" and confirms his selection by activating the "Ok" button. After the document management application has received the selection (step S601), the document management application creates a new folder in the "20$^{th}$ Century European History" folder (step S602), such as shown in FIG. 7F. In an exemplary embodiment, the name of the new folder may be the same name as the file. Thus, for example, in this case, the new folder created for the document "World War I.pdf" may be named "World War I". In another exemplary embodiment, the "Professor Lee" may move the position of the "World War I" folder at any desired location. After the new folder has been created, the document management application may store the "World War I.pdf" into the "World War I" folder and by extension into the document repository. Next, "Professor Lee" can view the contents of the folder by clicking on it which causes the document management application to display a screen such as shown in FIG. 7G. In this case, "Professor Lee" has selected to view the contents of the "World War I" folder. Thus, at this time, he may only see the "World War I" outline that he uploaded.

Figure 8:
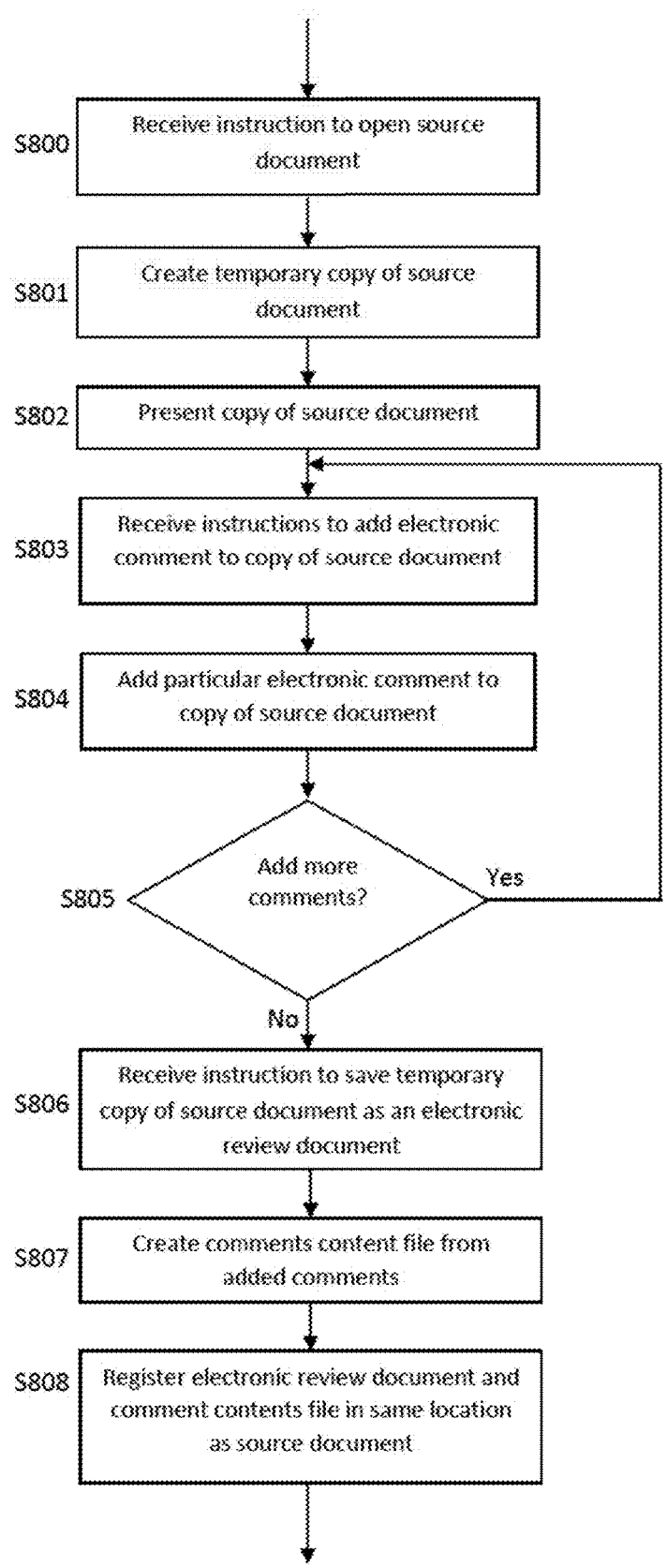
FIG. 8 shows a flow chart of a method, according to an exemplary embodiment, that can be performed in any of the systems shown in FIGS. 1, 2A, 2B and 2C.

FIG. 8 shows another method that can performed by a document management apparatus (e.g., 101 in FIG. 1; 201 in FIGS. 2A, 2B, 2C).

Figure 9A:
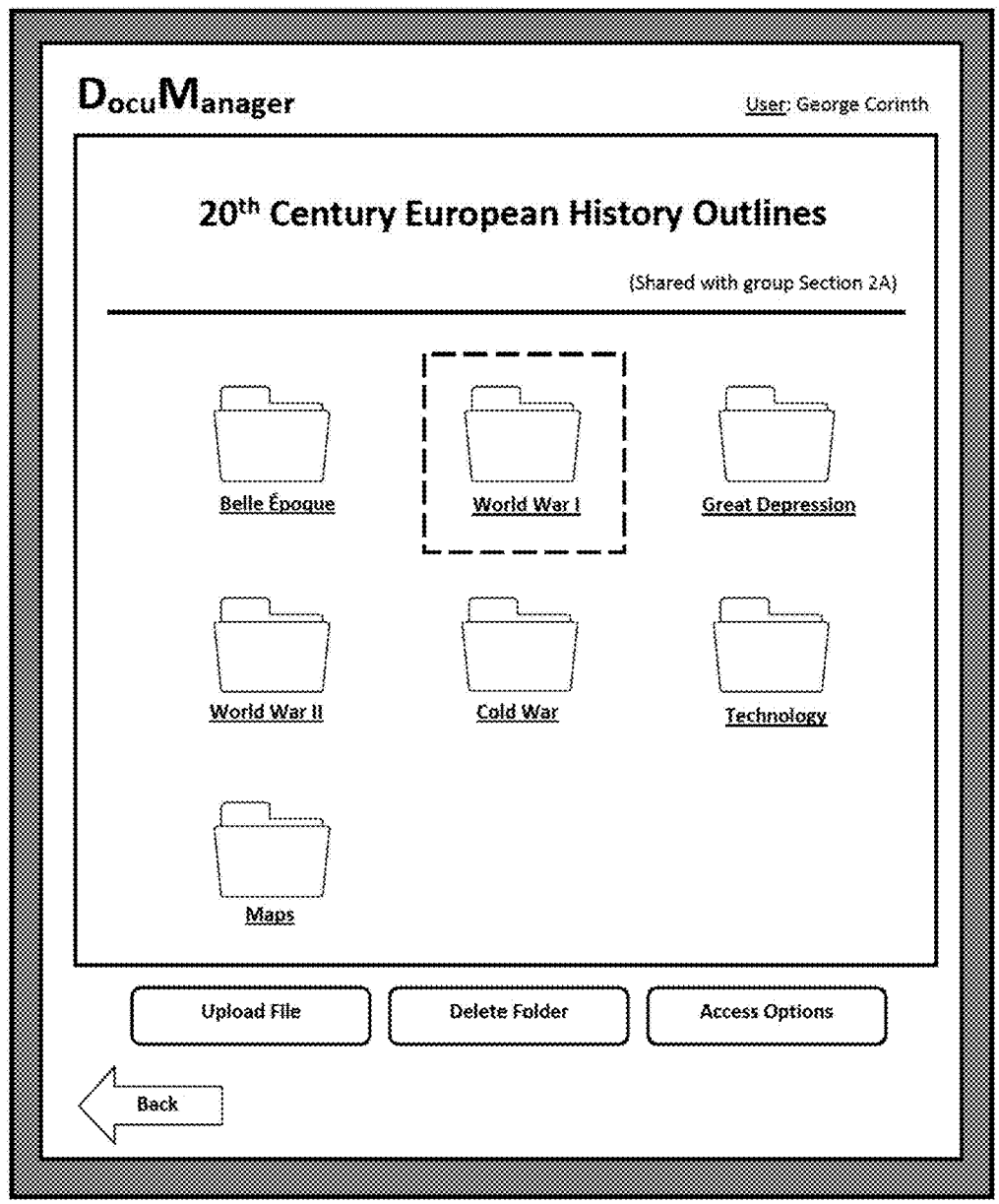
FIGS. 9A and 9B show respective examples of user interface screens that can be provided by an application including a document management function.
Figure 9B:
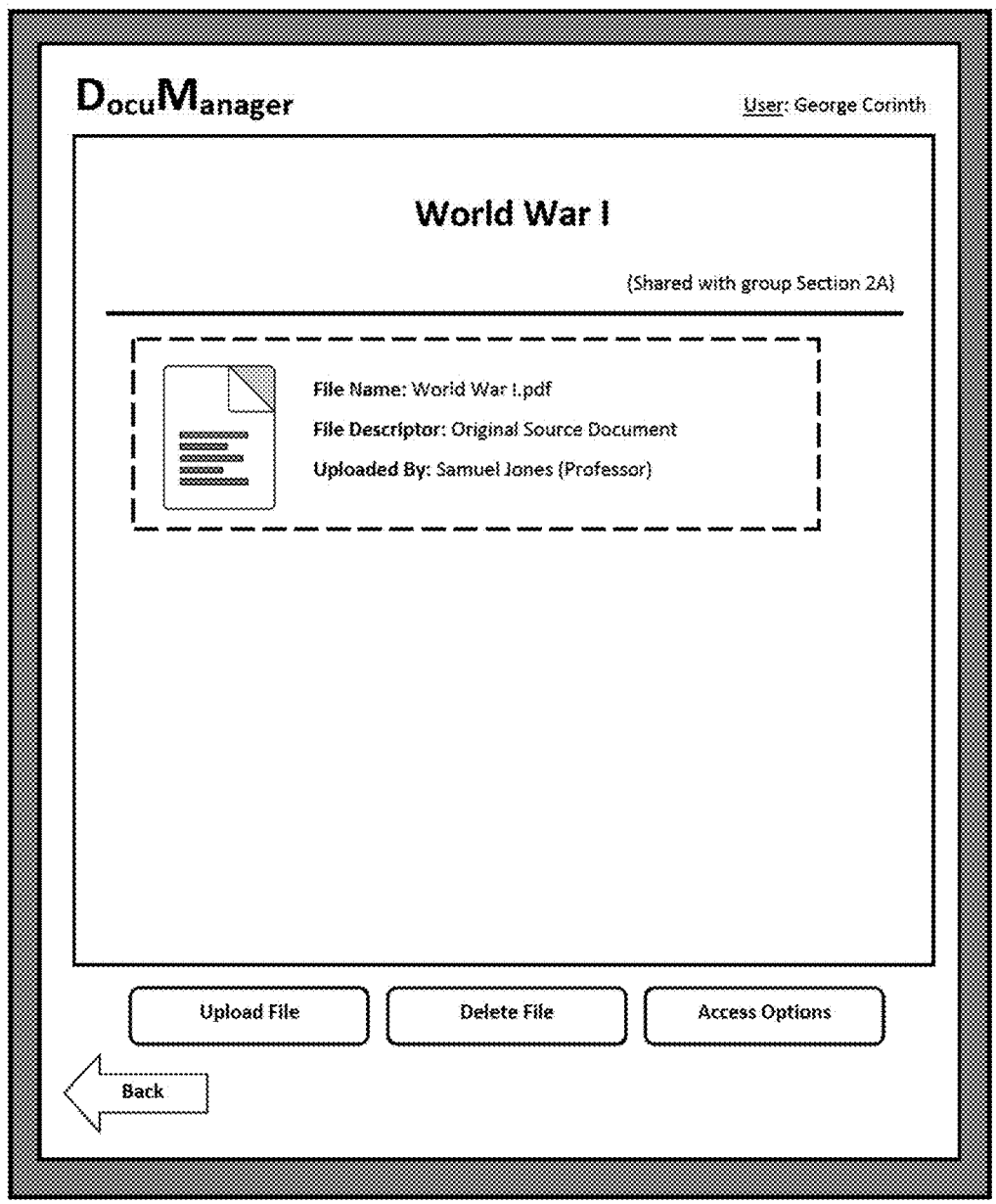
Figure 9C:
FIG. 9C shows an example of a user interface screen that can be provided by an application including a document editor function.

After "Professor Lee" has uploaded his "World War I" outline, he may inform his students via, for example, e-mail. During "Professor Lee's" lecture for "World War I", one or more of his students may decide to use the "World War I" outline to assist in learning. In one example, one of his students "George Corinth" may decide to view the "World War I" outline by first accessing the "20$^{th}$ Century European History" outline folder in the document repository via his terminal, such as shown in FIG. 9A. Then, "George Corinth" opens the folder containing the "World War I" outline which takes him to a screen in which he can access the file "World War I.pdf" previously uploaded by "Professor Lee", such as shown in FIG. 9B. Next, "George Corinth" may select to view the file "World War I.pdf" which causes the document management application to open the file "World War I.pdf" via a document creation application that can be linked with the document management application (step S800), such as shown in FIG. 9C.

In this case, the original file "World War I.pdf" is not opened by the document creation application. Instead, the document management application creates a copy of the original source document "World War I.pdf" (step S801) and presents such copy to the user (step S802). This is because "George Corinth" cannot modify the original source document "World War I.pdf". In an exemplary embodiment, when the document management application creates a copy of the source document "World War I.pdf", it may create a document identifier at location on each page of the copy.

It should be noted that, in this case, because the source document "World War I.pdf" is a "PDF" file, the document management application may utilize a document creation application called "Document Editor X" (which can open "PDF" files) to open the file "World War I.pdf". However, while the document creation application "Document Editor X" is used, it does not necessarily mean that it is opened separately from the document management application. Instead, the document creation applications (e.g., Microsoft Word, Adobe Acrobat, iWork Pages, etc.) used to open files stored in the document repository are temporarily integrated with the document management application. For example, as discussed supra with reference to FIG. 7A, "Professor Lee" created the "World War I" outline via the document viewing application "Document Editor X". However, in the example shown in FIG. 9C, since the document management application has opened the Document Editor X, there are new options (e.g., "Insert/Delete Comments", "Add/Delete Other User's Comment(s)", etc.) that can be accessed by "George Corinth".

As state previously, the outlines uploaded by "Professor Lee" may not be detailed as the corresponding lecture. Thus, "George Corinth" may decide to add comments corresponding to statements made by "Professor Lee" to the copy of the "World War I" outline during class by activating the "Insert/Delete Comment" button (step S804). In this case, the comments are electronic. In other words, the document creation application "Document Editor X" or the document management application may provide the user with the ability to create graphical markers (e.g., text box, speech bubble, thought bubble, arrows, lines, etc.) to create comments that are not handwritten. Thus, "George Corinth" may merely insert the type of graphical indicator/marker that he desires and type in characters, words or sentences, to create such electronic comment.

Figure 9D:
FIG. 9D shows an example of a user interface screen that can be provided by an application including a document management function.

After the document management application adds the comment to the copy of the source document (step S804), it determines if there are more comments to be added (step S805). In the case that there are more comments to be added (step S805, yes), the document management application repeats the process. Otherwise (step S805, no), the document management application may receive an instruction to save the copy of the source document (step S806). In other words, after the lecture by "Professor Lee" completed, "George Corinth" may select to save his copy of the source document as an electronic review document by activating the "Save Current Document". When this happens, the document management application creates a comments content file which is a file that contains all the comments that were previously made by "George Corinth" (step S807). Next, the document management application stores the electronic review document and the corresponding comments content file in the same folder as the source document (step S808), such as shown in FIG. 9D. In this case, the electronic review document displays the user who created it (in this case "George Corinth") and the comments content file display the electronic review document that it is associated with.

It should be noted that one reason why the electronic review document might be stored in the document repository is because there might be a collaborative effort among the students in "Professor Lee's" class to assist each other in learning. In other words, when "Professor Lee" lectures, not every student catches every word that is said by "Professor Lee". Further, some students may believe that one statement by "Professor Lee" is important while others may not. By allowing students to upload their electronic review documents with their personal comments, students can better understand the topic and be aware of materials that were missed.

Figure 10:
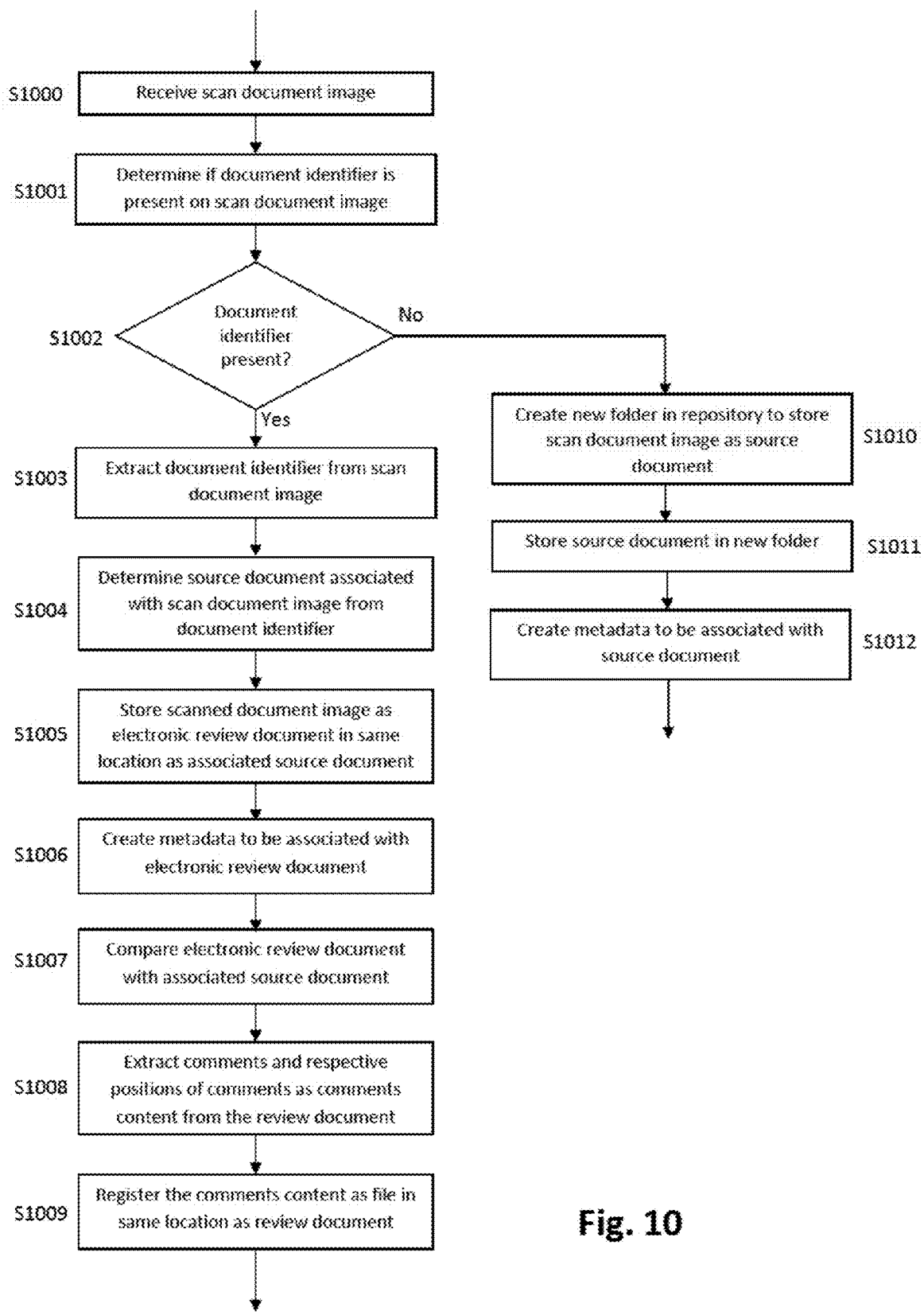
FIG. 10 shows a flow chart of a method, according to an exemplary embodiment, that can be performed in any of the systems shown in FIGS. 1, 2A, 2B and 2C.

FIG. 10 shows another method that can performed by a document management apparatus (e.g., 101 in FIG. 1; 201 in FIGS. 2A, 2B, 2C).

Figure 11A:
FIG. 11A shows an example of a hardcopy source document including a document identifier.

Not all students may be comfortable with using their terminal to create comments on their electronic review documents. In other words, some students may prefer to write using a physical medium (e.g., pen, pencil, marker, highlighter, etc.) on a hardcopy of the source document instead. For example, in this case a student "James Mahan" may prefer to write down comments during class as opposed to creating electronic comments. Thus, "James Mahan" may print out a hardcopy of the source document "World War I.pdf" via a printer (e.g., 105 in FIGS. 1, 2A, 2B, 2C) or an MFP (e.g., 106 in FIGS. 1, 2A, 2B, 2C), such as shown in FIG. 11A. Further, it should be noted that every time a copy of the source document is printed out, the document management application creates a unique document identifier (e.g., QR code, barcode, etc.) for that copy. In one exemplary embodiment, the unique document identifier may include information that associates the copy with the source document. In another exemplary embodiment, the unique document identifier may have information corresponding to the user who printed out the copy.

Next, after "James Mahan" has completed writing his comments, he may upload his hardcopy of the source document to the document repository by first scanning his physical copy with the written comments via document scanner (e.g., document scanner 104). In one exemplary embodiment, the document scanner may also include the document management application or portions of the document management application. Thus, when the document scanner scans the physical copy of the source document into a scan document image, the scan document image may be immediately processed by the document management application without forcing the student to manually upload the scan document image to the document repository via his or her terminal.

Thus, after the document management application receives the scan document image (step S1000), the document management apparatus may determine if there is a document identifier in the scan document image (step S1001). If there is no document identifier (step S1002, no), the document management application may determine that the scan document image is an original source document. Thus, the document management application may create a new folder in the document repository to store the scan document image as a source document (step S1010). In an exemplary embodiment, the document management application may utilize the user authentication information when the student logged into the document scanner to determine the location to create the folder. Afterwards, the document management application stores the source document inside the folder (step S1011). Next, the document management application creates metadata to be associated with the source document (step S1012).

Otherwise (step S1002, yes), in the case that there is a document identifier on the scan document image, the document management application extracts the document identifier from the scan document image (step S1003) and determines the source document that is associated with the scan document image via the document identifier (step S1004). Next, the document management application stores the scan document image in the same location as the associated source document as an electronic review document (step S1005). Next, the document management application creates metadata to be associated with the electronic review document (step S1006). For example, such metadata may contain information regarding the user who create the document, the source document associated with this electronic review document, etc. Then, the document management application compares the stored electronic review document with the source document (step S1007) to extract the written comments from the stored electronic review document and their respective positions (step S1008).

For example, the document management application may scan the entire electronic review document, for example, pixel-by-pixel and compare the corresponding pixel in the associated source document. In the case that the pixels are the same, the document management application may move on. On the other hand, in the case that the pixels are different, the document management application may determine that such pixel belongs to a written comment. Thus, after performing the analysis, the document management application may extract the comments and record their positions with respect to the electronic review document.

Figure 11B:
FIG. 11B shows an example of a user interface screen that can be provided by an application including a document management function.

After performing the extraction, the document management application creates a comments content file which includes the extracted comments and their respective positions (step S1009), such as shown in FIG. 11B. It should be noted that all of the above steps are performed by the document management application automatically without any assistance from the student. It should also be noted that, in an exemplary embodiment, the comments content file is located in the same folder as the source document and the corresponding electronic review document. Further, the comments content file may also include a description of whether the comments content file includes comments that are handwritten (e.g., in image format) or that are represented by graphical markers/indicators (e.g., electronic).

Figure 12:
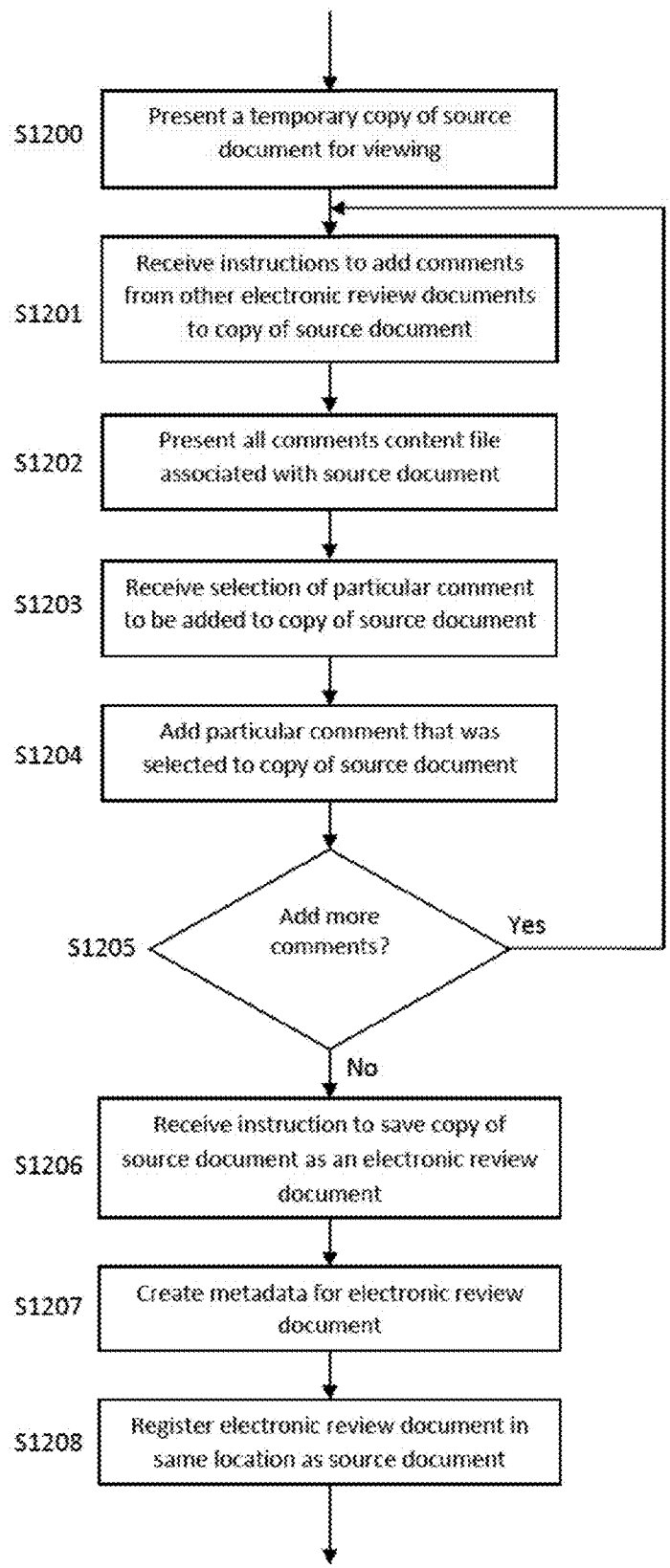
FIG. 12 shows a flow chart of a method, according to an exemplary embodiment, that can be performed in any of the systems shown in FIGS. 1, 2A, 2B and 2C.

FIG. 12 shows another method that can performed by a document management apparatus (e.g., 101 in FIG. 1; 201 in FIGS. 2A, 2B, 2C).

It is possible that not all students may have attended "Professor Lee's" lecture. In one example, one student, "Steve Powell", may have had an illness that day and therefore did not get to learn the material in class or obtain important information from "Professor Lee's" lecture. However, "Steve Powell" can remedy this problem by accessing the document repository and viewing his fellow classmate's version of the "World War I" outline. Further, "Steve Powell" may also be able to combine comments from one or more of his classmates into one electronic review document to maximize his studying.

Figure 13A:
FIGS. 13A-13C show respective examples of user interface screens that can be provided by an application including a document editor function.
Figure 13B:
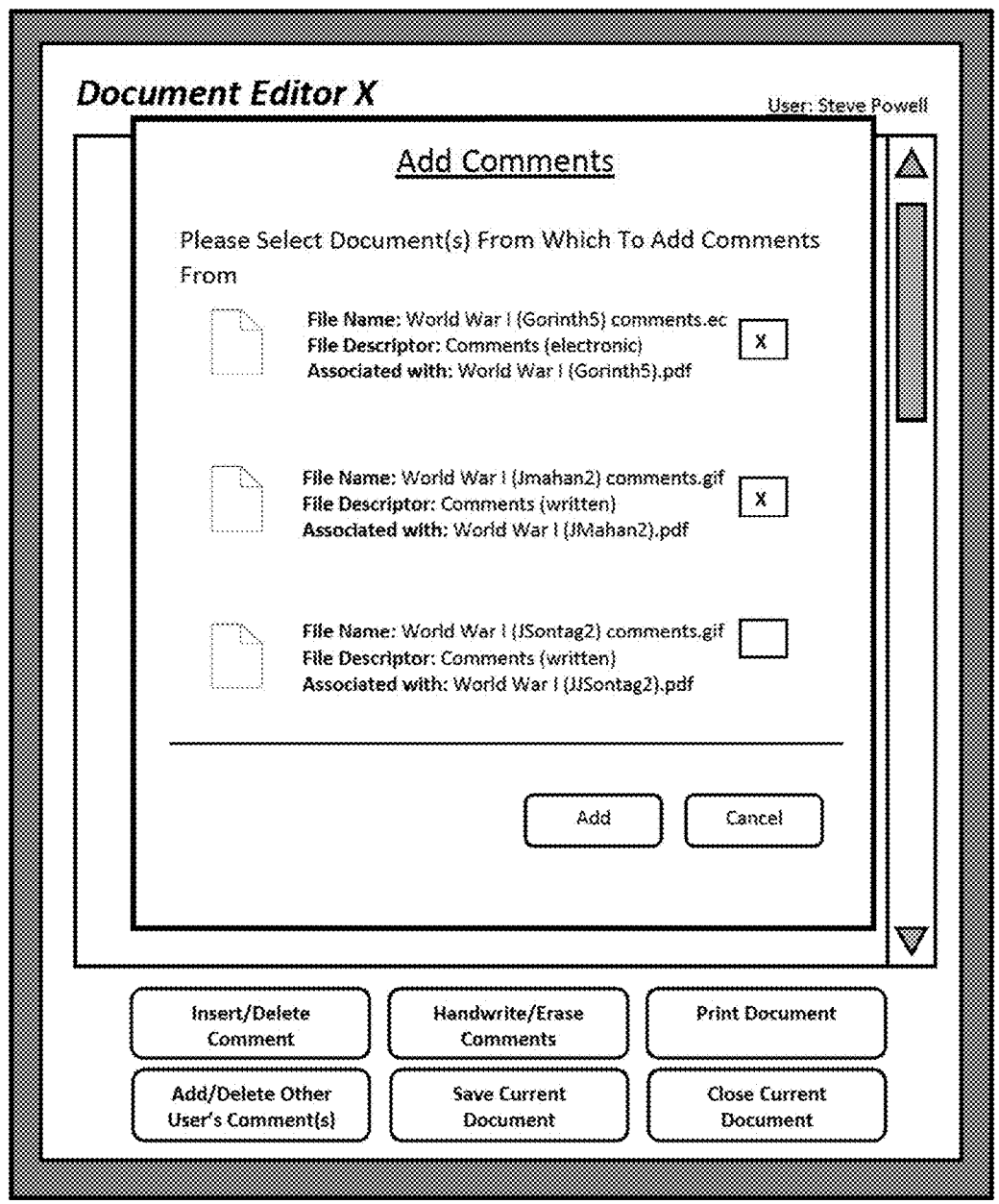

To facilitate this, "Steve Powell" may first open a temporary copy of the source document "World War I.pdf" on his terminal (step S1200), such as shown in FIG. 13A. Next, he may select to add comments from his classmates by activating the "Add/Delete Other User's Comment(s)" button. When the document management application receives the instruction to add comments from others (step S1201), it presents all the content comment files that are associated with the source document (step S1202), such as shown in FIG. 13B. Thus, "Steve Powell" can select any of the comments content file which were created from the comments made by his classmates and add them to the temporary copy of the source document. In this case, he may select to add comments made previously by "George Corinth" and "James Mahan".

Figure 13C:
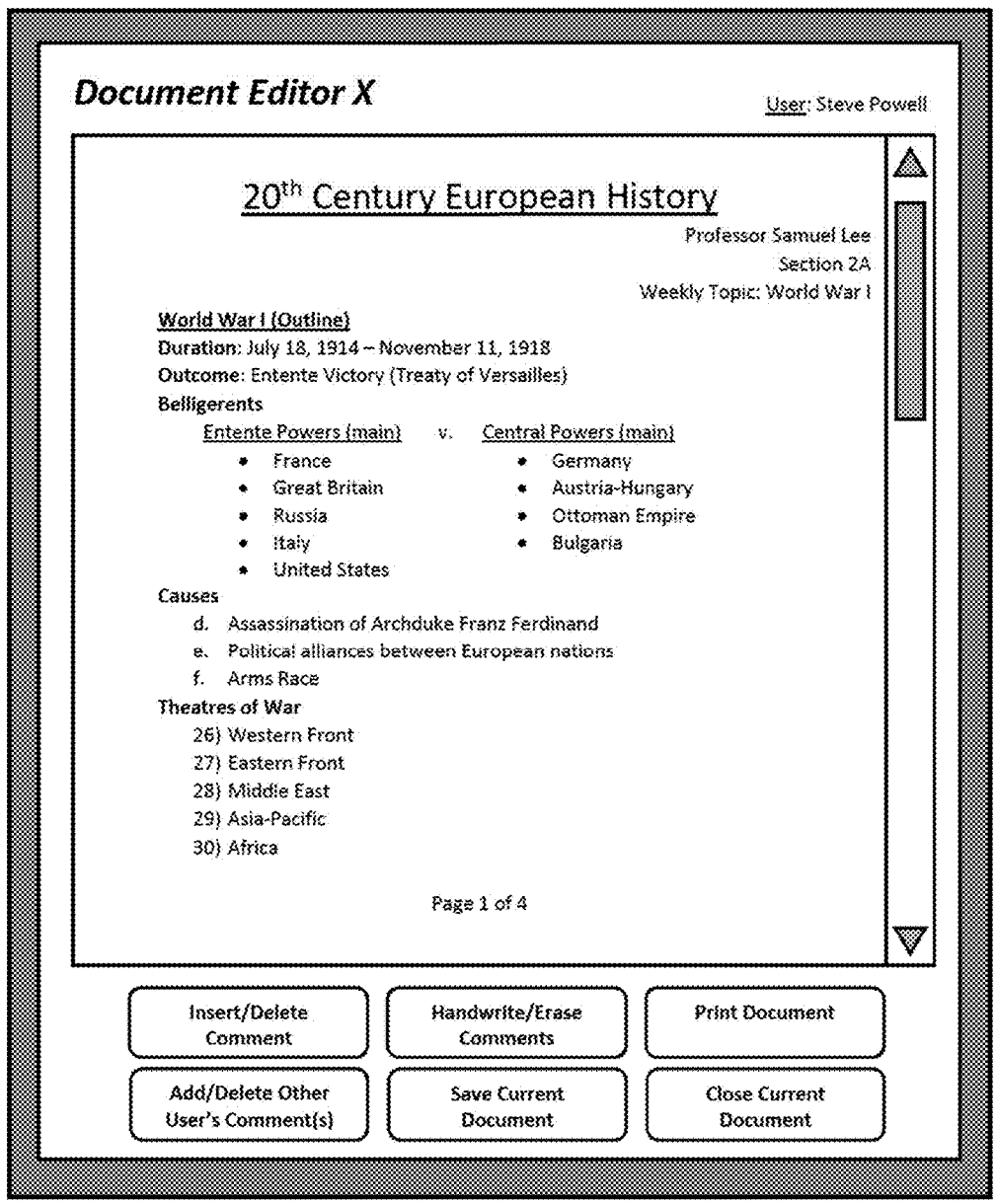

Once the document management application receives the selection of which comments to add (step S1203), the document management application adds the selected comments to the temporary copy of the source document (step S1204), such as shown in FIG. 13C. As can be seen, both the electronic comments made by "George Corinth" and the written comments made by "James Mahan" are added. It should be noted that in an exemplary embodiment, there may times in which the positions of one set of comments (e.g., electronic comment reciting "Rivalry between France and Germany for domination of Europe") and another set of comments (e.g., written comment reciting "Royal Navy vs. Imperial Germany Navy") may be at the same position and may overlap. In such case, the document management application may move one of the comments to another position to prevent conflict (e.g., by electronic comment reciting "Rivalry between France and Germany for domination of Europe" being moved several spaces up to prevent conflict with written comment reciting "Royal Navy vs. Imperial Germany Navy", in FIG. 13C).

Next, the document management application determines if any more comments are to be added (step S1205). In the case that there are more comments to be added (step S1205, yes), the document management application repeats the process. Otherwise (step S1205, no), the document management application may receive an instruction to save the copy of the source document (step S1206). In other words, after "Steve Powell" has is satisfied with adding comments, he may select to save his copy of the source document as an electronic review document by activating the "Save Current Document". When this happens, the document management application creates a comments content file which is a file that contains all the comments that are in the electronic review document made by "Steve Powell" (step S1207). Afterwards, the document management application stores the electronic review document and the corresponding comments content file in the same folder as the source document (step S1208).

Figure 14:
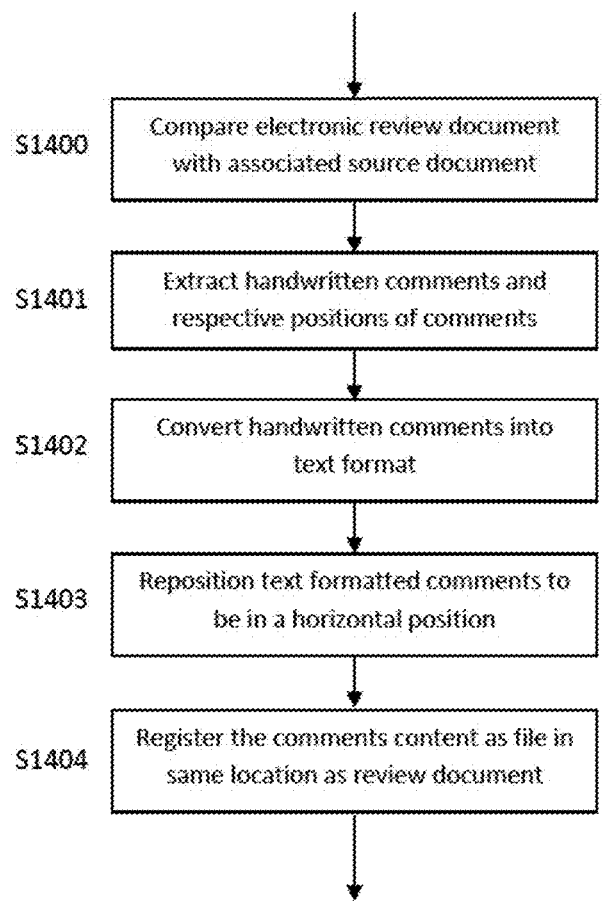
FIG. 14 shows a flow chart of a method, according to an exemplary embodiment, that can be performed in any of the systems shown in FIGS. 1, 2A, 2B and 2C.

FIG. 14 shows another method that can performed by a document management apparatus (e.g., 101 in FIG. 1; 201 in FIGS. 2A, 2B, 2C).

Figure 15:
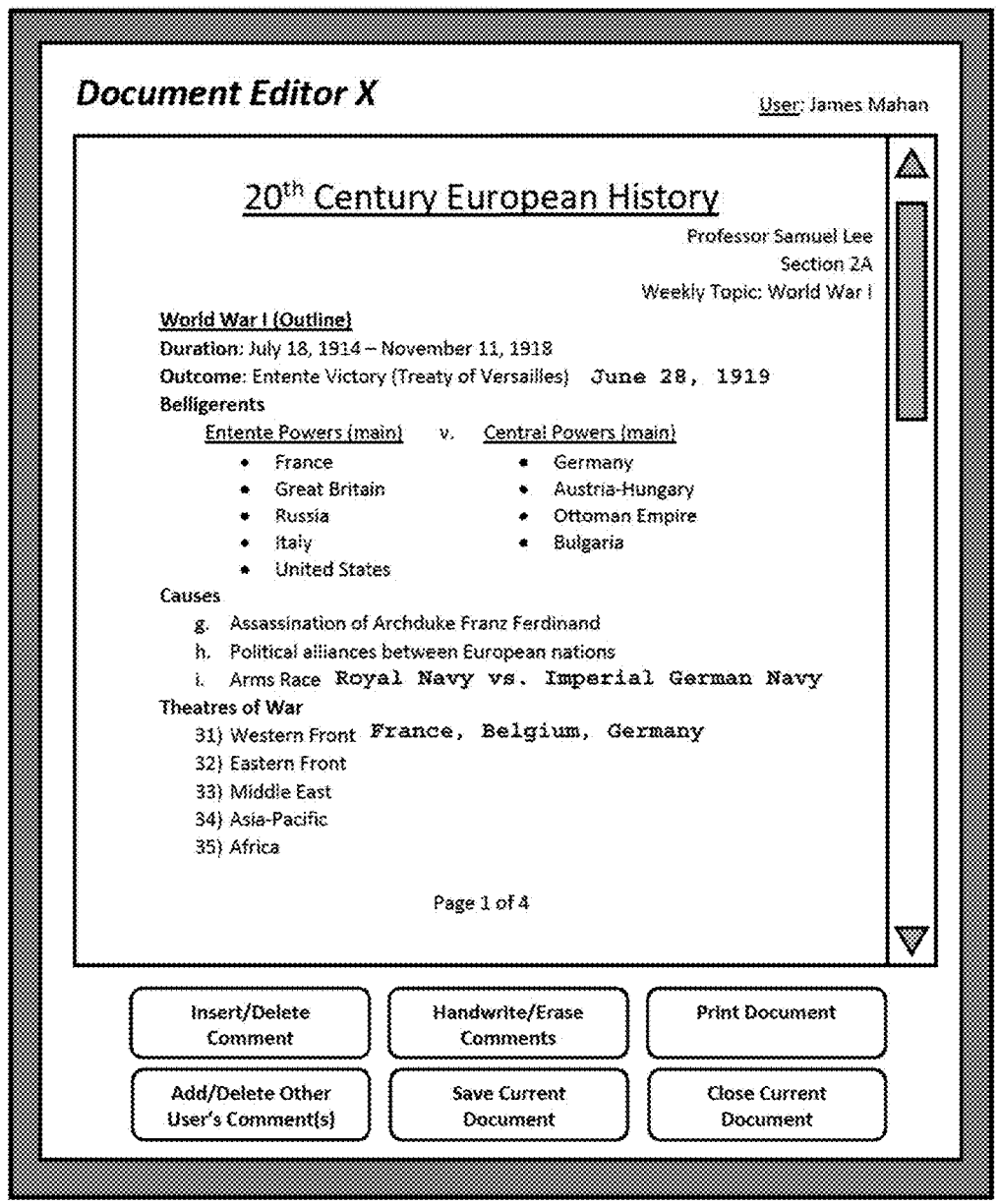
FIG. 15 shows an example of a user interface screen that can be provided by an application including a document editor function.

It is not always the case in which the document management application extracts handwritten comments from a scan document image as an image file. The document management application may instead convert the handwritten comments into text instead before adding them into the comments content file, such as shown in FIG. 15.

Such process commences when the document management application compares the stored electronic review document with the source document (step S1400) to extract the written comments from the stored electronic review document and their respective positions (step S1401).

For example, the document management application may scan the entire electronic review document, for example, pixel-by-pixel and compare the corresponding pixel in the associated source document. In the case that the pixels are the same, the document management application may move on. On the other hand, in the case that the pixels are different, the document management application may determine that such pixel belongs to a written comment. Thus, after performing the analysis, the document management application may extract the comments and record their positions with respect to the electronic review document.

After extracting the handwritten comments, the document management application may convert each of the handwritten comments into text (step S1402). Next, the document management application repositions any handwritten comments that are not in a horizontal position (e.g., vertical, diagonal, etc.) into a position that closely matches the portion of the original source document that the comments refer to (step S1403). Finally, the document management application stores the electronic review document and the corresponding comments content file in the same folder as the source document (step S1408).

FIG. 16 shows an example of a table associating review file and comments content with source document. In such example, the table contains the name and corresponding user name of each person. Further, the table also includes information regarding the comments for each electronic review document uploaded by each user. In other words, it may not be, as previously stated, that the comments and their corresponding positions have a separate file from their corresponding electronic review documents. Instead, the comments and their corresponding positions may be stored as metadata associated with their respective electronic review document.

Figure 17:
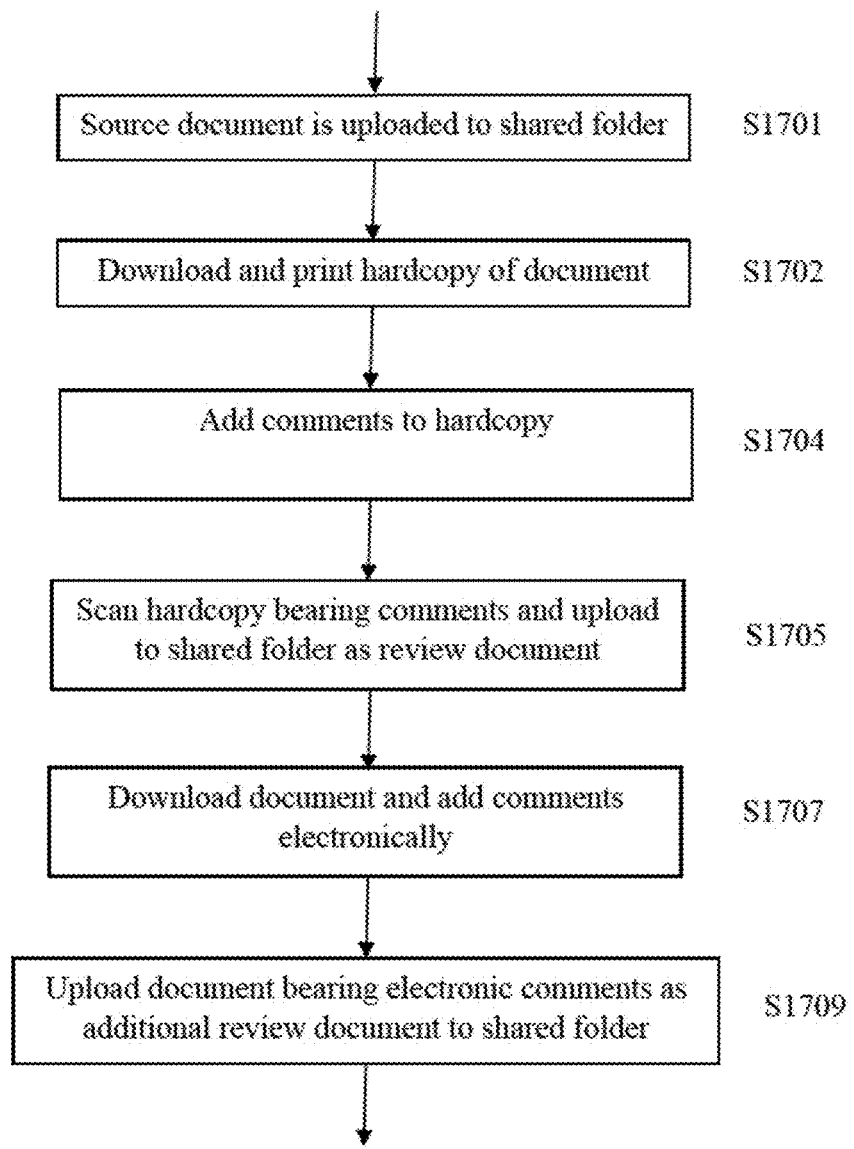
FIG. 17 shows a flow chart of a workflow, according to another exemplary embodiment, that can be performed in any of the systems shown in FIGS. 1, 2A, 2B and 2C.

Various workflows are possible in the systems shown in FIGS. 1, 2A, 2B and 2C, as should be apparent from the discussion above. Another workflow is shown in FIG. 17, according to another embodiment. In such workflow, when a source document is uploaded to a shared folder (S1701), it becomes available to those having access to the shared folder. In some instances, a user having access would download the source document and print it as a hardcopy (S1702) and then add comments to the hardcopy (S1704). Such hardcopy bearing the comments thereon may then be scanned and uploaded as a review document (image) to the shared folder (S1705). Further, another user may download the source document and add comments electronically thereto (S1705). The document bearing the electronic comments may also be uploaded as an additional review document to the shared folder (S1709).

Figure 18:
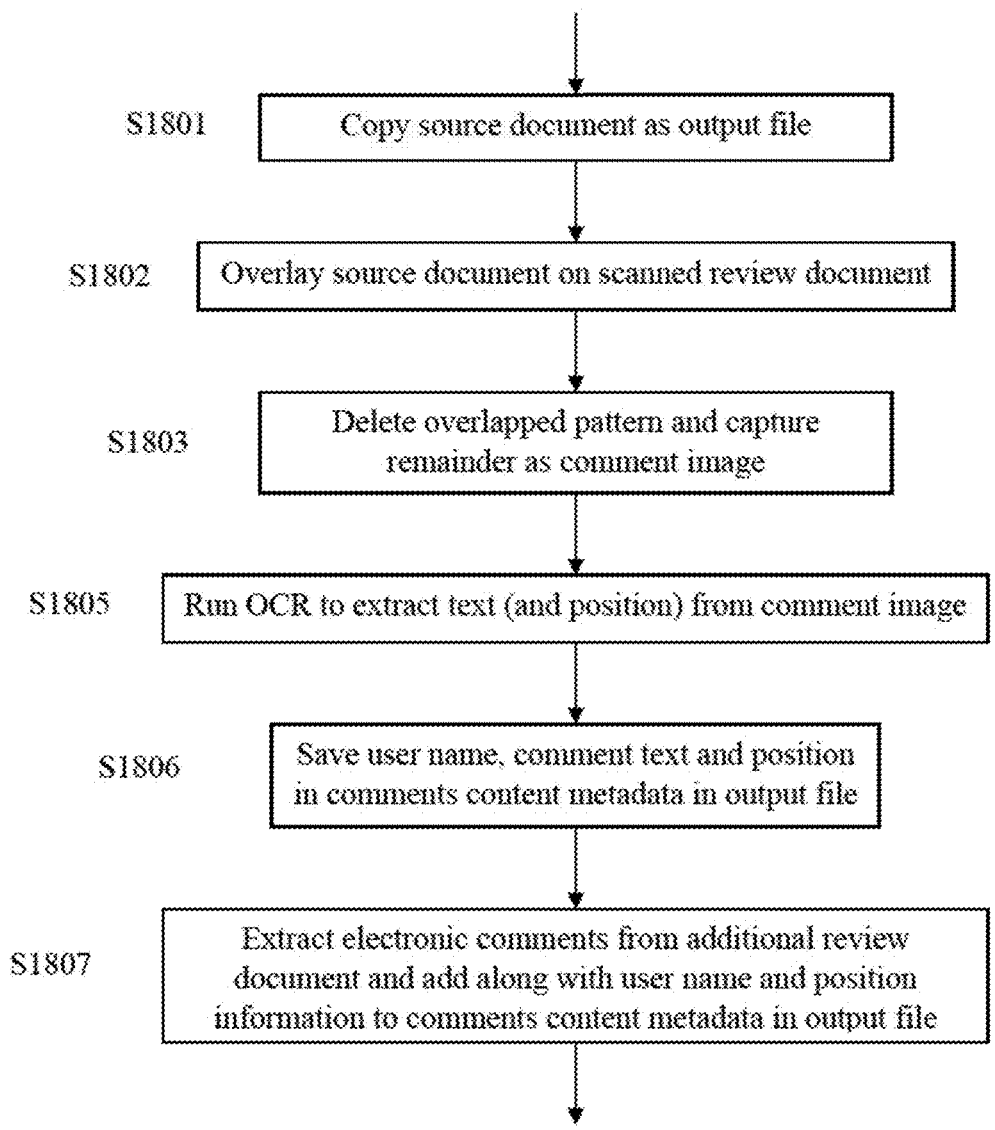
FIG. 18 shows a flow chart of a workflow, according to another exemplary embodiment, that can be performed in any of the systems shown in FIGS. 1, 2A, 2B and 2C.

At a later time, one of the users having access may wish to combine all of the documents in the shared folder into a single output document and the workflow shown in FIG. 18 may be applied. In such workflow, the source document is copied as the starting point of the output file (S1801). Next, the source document is overlaid on the scanned review document (S1802), and the overlapped pattern (i.e. the content of the source document) is deleted from such combination, with the remainder being captured as a comment image (S1803). Next, OCR (and/or handwriting conversion) processing is performed to extract text (as well as associated position) from the comment image (S1805). Such extracted comment text and position information are saved along with user name (i.e. author of review document) in comments metadata in the output file (S1806). In addition, the electronic comments (and associated position information) are extracted from the additional review document and saved along with user name (i.e. author of additional review document) in the comments metadata in the output file (S1807).

Such output file may be useful as is to some users, and other users may render all of the comments metadata (e.g., superposed) on the source document which is captured by the output file.

The orders in which the steps are performed in the aforementioned methods are not limited to those shown in the examples of FIGS. 6, 8, 10, 12 and 14, and may be switched as long as similar results are achieved. Also, it should be noted that the methods or processes illustrated in the examples of FIGS. 6, 8, 10, 12 and 14 may be implemented using any of the systems described in connection with FIGS. 1, 2A, 2B, 2C, as well as other similar systems.

The aforementioned specific embodiments and examples are illustrative, and many variations can be introduced on them without departing from the spirit of the disclosure or from the scope of the appended claims. For example, although various aspects, features and advantages are discussed herein in connection with document management, it should be understood that such aspects and features may be integrated in a program that is not application software per se, but may be instead, for example, a back end processing system, middleware, a snap-in, a plug-in, an add-on, an extension, or another program not normally referenced as an application.

In addition, elements and/or features of different examples and illustrative embodiments may be combined with each other and/or substituted for each other within the scope of this disclosure and appended claims.

What is claimed is:

1. A document management apparatus including one or more programs of instructions which are stored in a non-transitory storage medium and are executable by a processor of a host computer to configure the host computer to comprise:
   a comments extraction module to compare (a) a source document registered in a document repository and (b) a scan document image of the source document, to extract, from the scan document image, comments added to the source document by a comments author and determine a position of the comments in the document image;
   a registration module to register the extracted comments and corresponding position, as comments content in association with the source document in the document repository, the comments content being registered in association with a user name of the comments author of the registered comments; and
   a contents review module to provide, upon request from a user terminal, the comments content along with the user name of the author in a first interface of a document review user interface on the user terminal,
   wherein when the registered comments content includes plural sets of comments and corresponding user names of the respective authors of the registered sets of comments, a second interface of the document review user interface displays, for user selection, each of the plural registered sets of comments along with the respective registered user names which are registered in association with the source document in the document repository, and displays, upon receiving the user-selection of one or more of the registered sets of comments through the second interface of the document review user interface, the user-selected sets of comments superposed on an image of the source document in the first interface of the document review user interface on the user terminal.

2. The document management apparatus as claimed in claim 1, wherein when the scan document image is registered as an electronic review document in association with the source document in the document repository, the comments extraction module automatically extracts from the electronic review document the added comments and the position of the comments in the electronic review document, and passes the extracted comments content to the registration module for registration in association with the electronic review document and the source document.

3. The document management apparatus as claimed in claim 1, wherein the registration module registers the source document in a corresponding shared folder in the document repository and registers the document image bearing the comments added to the source document, and the comments content including the extracted comments and corresponding position, in the corresponding shared folder of the source document.

4. The document management apparatus as claimed in claim 1, further comprising:
   a comments annotation user interface to receive user selection of the source document and user entry of comments text to be associated as metadata of an electronic review document with the source document,
   wherein the comments extraction module extracts the comments text from the metadata of the electronic review document and passes the extracted comments text to the registration module for registration of the extracted comments text in the comments content in association with the source document.

5. The document management apparatus as claimed in claim 4, wherein the comments extraction module passes the extracted comments text along with user name to the registration module, and the registration module registers the extracted comments text and user name in association with the electronic review document and the source document.

6. The document management apparatus as claimed in claim 4, wherein when the electronic review document including the metadata is registered in association with the source document in the document repository, the comments extraction module automatically extracts from the electronic review document the extracted comments text and passes the extracted comments text to the registration module for registration of the extracted comments text in the comments content in association with the electronic review document and the source document.

7. The document management apparatus as claimed in claim 6, wherein the comments extraction module saves the comments text along with user name in the comments content.

8. The document management apparatus as claimed in claim 1, further comprising:
   a comments annotation user interface to receive user specification of a position within the source document and user entry of comments text to be associated with the user-specified position, and to receive user command to capture the comments text, wherein upon receiving the user command to capture the comments text, the comments extraction module saves the comments text and associated position in the comments content for registration in association with the source document.

9. The document management apparatus as claimed in claim 1, further comprising:
an intelligent handwritten notes conversion module to detect handwritten notes amongst the extracted comments and convert the detected handwritten notes into handwriting-converted text,
wherein the registration module registers an electronic review document including the handwriting-converted text in association with the source document in the document repository.

10. The document management apparatus as claimed in claim 1, further comprising:
an OCR module to detect typed notes amongst the extracted comments and convert the detected typed notes into type-converted text,
wherein the registration module registers an electronic review document including the type-converted text in association with the source document in the document repository.

11. A document management system comprising:
a document repository registering one or more electronic documents in a non-transitory storage medium, each registered document amongst the one or more electronic documents being associated with a registered document identifier;
a host computer including one or more programs of instructions which are stored in a non-transitory storage medium and are executable by a processor of the host computer to configure the host computer to comprise:
a document identifier extraction module to extract a document identifier from a scan document image of a source document registered in the document repository;
a comments extraction module to compare the scan document image and the source document registered in the document repository and identified by the document identifier, to extract, from the document image, comments added to the source document by a comments author and determine a position of the comments in the document image;
a registration module to register the extracted comments and corresponding position, as comments content in association with the source document in the document repository, the comments content being registered in association with a user name of the comments author of the registered comments; and
a contents review module to provide, upon request from a user terminal, the comments content along with the user name of the author in a first interface of a document review user interface on the user terminal,
wherein when the registered comments content includes plural sets of comments and corresponding user names of the respective authors of the registered sets of comments, a second interface of the document review user interface displays, for user selection, each of the plural registered sets of comments along with the respective registered user names which are registered in association with the source document in the document repository, and displays, upon receiving the user-selection of one or more of the registered sets of comments through the second interface of the document review user interface, the user-selected sets of comments superposed on an image of the source document in the first interface of the document review user interface on the user terminal.

12. The document management system as claimed in claim 11, further comprising:
a document scanner to scan a hardcopy of the source document registered in the document repository, generate the scan document image and output the scan document image to the host computer or to the document repository.

13. A method performed by a document management apparatus, the method comprising:
(a) receiving a scan document image of a source document registered in a document repository and comparing the scan document image and the source document registered in the document repository, and extracting from the document image comments added to the source document by a comments author and determining a position of the comments in the document image;
(b) registering the extracted comments and corresponding position, as comments content in association with the source document in the document repository, the comments content being registered in association with a user name of the comments author of the registered comments; and
(c) providing, upon request from a user terminal, the comments content superposed on an image of the source document, along with the user name of the author, in a first interface of a document review user interface on the user terminal; and
(d) displaying, by a second interface of the document review user interface for user selection, when the registered comments content includes plural sets of comments and corresponding user names of the respective authors of the registered sets of comments, each of the plural registered sets of comments along with the respective registered user names which are registered in association with the source document in the document repository, and displaying, upon receiving the user-selection of one or more of the registered sets of comments through the second interface of the document review user interface, the user-selected sets of comments superposed on an image of the source document in the first interface of the document review user interface on the user terminal before or after (c).

14. The method as claimed in claim 13, further comprising:
registering the scan document image as an electronic review document in association with the source document in the document repository,
wherein after the scan document image is registered as the electronic review document in association with the source document in the document repository, the added comments and the position of the comments in the electronic review document are automatically extracted by the document management apparatus from the electronic review document, and then registered in association with the electronic review document and the source document, in a corresponding shared folder in the document repository.

15. The method as claimed in claim 13, further comprising:
(a1) providing a comments annotation user interface to receive user selection of the source document and user entry of comments text to be associated as metadata of an electronic review document with the source document; and (a2) registering the electronic review document including the comments text as the metadata of the electronic review document in association with the source document, wherein after the electronic review document including the metadata is registered in association with the source document in the document repository, the comments text is automatically extracted by the document management apparatus from the electronic review document and registered in the comments content in association with the electronic review document and the source document.

16. The method as claimed in claim 13, further comprising:

(b1) detecting handwritten notes amongst the extracted comments and converting the detected handwritten notes into handwriting-converted text, (b2) registering an electronic review document including the handwriting-converted text in association with the source document in the document repository.

17. The method as claimed in claim 13, further comprising:

(b1) detecting typed notes amongst the extracted comments and converting the detected typed notes into type-converted text, (b2) registering an electronic review document including the type-converted text in association with the source document in the document repository.

* * * * *